(12) United States Patent
Heape

(10) Patent No.: US 10,453,153 B2
(45) Date of Patent: Oct. 22, 2019

(54) FURNITURE MANUFACTURING SYSTEM WITH ON-DEMAND PRODUCTION

(71) Applicant: Gary C. Heape, Colleyville, TX (US)

(72) Inventor: Gary C. Heape, Colleyville, TX (US)

(73) Assignee: Ecotomic Group, Inc., Arlington, TX (US)

( * ) Notice: Subject to any disclaimer, the term of this patent is extended or adjusted under 35 U.S.C. 154(b) by 18 days.

(21) Appl. No.: 15/905,773

(22) Filed: Feb. 26, 2018

(65) Prior Publication Data

US 2018/0350011 A1     Dec. 6, 2018

Related U.S. Application Data

(60) Provisional application No. 62/463,944, filed on Feb. 27, 2017.

(51) Int. Cl.
| | |
|---|---|
| *G06Q 50/04* | (2012.01) |
| *G06Q 30/06* | (2012.01) |
| *G06Q 10/06* | (2012.01) |
| *G06Q 10/08* | (2012.01) |

(52) U.S. Cl.
CPC ............ *G06Q 50/04* (2013.01); *G06Q 10/06* (2013.01); *G06Q 30/06* (2013.01); *G06Q 10/087* (2013.01)

(58) Field of Classification Search
CPC ...... G05B 19/4097; G05B 2219/45229; G05B 2219/45205; G05B 2219/35012; G05B 15/02

See application file for complete search history.

(56) References Cited

U.S. PATENT DOCUMENTS

| | | | |
|---|---|---|---|
| 6,191,382 B1* | 2/2001 | Damikolas | B23K 26/04 219/121.62 |
| 6,690,990 B1* | 2/2004 | Caron | B27G 1/00 144/363 |
| 2006/0032356 A1* | 2/2006 | Newman, Jr. | B23D 45/046 83/486 |
| 2006/0259172 A1* | 11/2006 | Trammell | G06Q 30/0603 700/97 |
| 2007/0270996 A1* | 11/2007 | Roise | G06Q 10/06 700/171 |
| 2010/0228380 A1* | 9/2010 | Giudiceandrea | B27B 1/00 700/118 |
| 2013/0297458 A1* | 11/2013 | Van de Capelle | G06Q 30/0635 705/26.81 |
| 2017/0031350 A1* | 2/2017 | Dew | G05B 19/4097 |

* cited by examiner

*Primary Examiner* — Chun Cao
*Assistant Examiner* — Charles Cai
(74) *Attorney, Agent, or Firm* — Braxton Perrone, PLLC

(57) ABSTRACT

A system and method for furniture manufacturing with on demand production. As order opportunities are placed by consumers into the network, backlogs and tooling available for connected factories are considered. Based on these considerations a determination is made of which of the associated factories have cleared paths for producing the on-demand furniture based upon the consumer's requirements. The eligible factories are then notified and allowed with a single entry of a command transmitted over a network to indicate that their factory is available and wishes to pursue the opportunity in manufacturing the consumer's desired on-demand furniture.

18 Claims, 39 Drawing Sheets

Pattern   1 —   10 boards  (2 books @ 5)
                  Length head

** Used size = 71 3/32 x 148 15/32      Loss = 5.49 %
** Number of cuts/book = 9.0
** Cycle time = 66 seconds    Pattern time = 2.2 minutes
** Number of open items = 3

0.7813    Job 001 3-D (2018-0001-0303-8A)

Order Information 0.7813    001

| Order | Width x Length | Qty Req. | Qty +/- | Patterns |
|---|---|---|---|---|
| [1]001 | 24 x 24 | 6 | 0 | 7(3d) 9(3d) |
| [2]001 | 13 11/32x 24 | 3 | 0 | 9(3d) 9(3d) |
| [3]001 | 13 11/32x 22 3/8 | 9 | 0 | 6(3d) 9(3d) |
| [4]001 | 16 1/8 x 39 3/4 | 239 | 0 | 3 4 5 6 7 7(3d) 8 |
| [5]001 | 13 11/32x 39 3/4 | 2 | 0 | 9(3d) |
| [6]001 | 13 11/32x 14 1/2 | 2 | 0 | 11(3d) |
| [7]001 | 13 11/32x 35 13/16 | 6 | 0 | 6(3d) 6(3d) 6(3d) |
| [8]001 | 24 x 35 13/16 | 11 | 0 | 2 6(3d) |
| [9]001 | 16 29/32x 53 7/16 | 12 | 0 | 6(3d) 12(3d) |
| [10]001 | 37 11/16x 53 7/16 | 12 | 0 | 4 4(3d) |
| [11]001 | 31 7/8 x 104 29/32 | 1 | 0 | 1 11(3d) |
| [12]001 | 29 29/32x 81 3/32 | 1 | 0 | 13 |
| [13]001 | 16 1/8 x 36 25/32 | 6 | 0 | 13 |
| [14]001 | 20 31/32x 14 5/32 | 4 | 0 | 6(3d) 10(3d) |
| [15]001 | 31 3/32 x 37 25/32 | 2 | 0 | 6(3d) |
| [16]001 | 44 3/32 x 102 3/4 | 1 | 0 | 10(3d) |
| [17]001 | 36 3/16 x 98 1/32 | 2 | 0 | 12 |
| | | | 0 | 10 |

FIG. 11A

```
0.7813    Job 001 3-D (2018-0001-0303-8A)

Order information  0.7813    001
                              Qty    Qty   Qty
Order    Width  x Length      Req.   +/-   Patterns

FURNITURE MANUFACTURING SYSTEM WITH ON-DEMAND PRODUCTION

PRIORITY CLAIM

This application claims priority to U.S. Provisional Patent Application No. 62/463,944 filed Feb. 27, 2017, which is incorporated by reference herein in its entirety.

FIELD OF THE INVENTION

The present invention relates to custom, made-to-order and on-demand, furniture manufacturing technology enhanced by a virtual exchange network complimented with a business advisory service connecting factories, furniture industry experts, designers and consumers to optimize the entire furniture manufacturing production and supply chain.

BACKGROUND OF THE INVENTION

The design and manufacturing of furniture produced has until now been based on the designs and sales volume predicted by manufacturers. With production of the furniture based on the prediction of manufacturers, furniture that is produced in bulk is then stored in warehouses until a time that it is sold. This renders the supply chain, and associated working capital, inefficient requiring manufacturers, who produce goods in bulk, and retailers who sell direct to consumers to store the goods indefinitely until they are purchased by a consumer. In order to minimize the manufacturer or retailer stockpiling inventory, as in the current environment, an on-demand furniture manufacturing technology platform is needed.

Additionally, an on-demand capability in furniture manufacturing would allow a consumer to obtain unique pieces specifically designed to meet their needs. Currently, when a consumer is looking to purchase furniture, the consumer must take time to research each individual store that sells furniture to determine the model of his interest. The consumer must then determine whether the model he has chosen comes in the specific style, fabric or size of interest. If the model that he desires does not come in the style, fabric or size that he has chosen, the consumer is then left with a decision. He must either choose to purchase the model of furniture that he has found or forego the model in order to find another model that comes in the style, fabric and size that he desires. The fact that the consumer is unable to find the model or furniture design of choice because, for example, the required fabric is not available is undesirable to the consumer. An on-demand service would allow the consumer to develop a unique furniture model that is of his interest that can then be ordered from a manufacturer who operates using this on-demand manufacturing technology platform.

SUMMARY OF THE INVENTION

The present invention enables on-demand furniture manufacturing and overcomes the above-mentioned disadvantages and drawbacks that have previously been seen in the current manufacturer's demand driven environment. As such, the general purpose of the present New Pier Platform (NPP), which will be described in greater detail, is to provide the technological capability for on-demand furniture manufacturing and optimizing factory set up, execution and production (from materials ordering to finished product). The optimization of the factory production is critical to making on-demand, one-off, custom designed furniture economically viable for the manufacturer.

The NPP has the added benefit of utilizing already existing legacy furniture manufacturing infrastructure and equipment assets, therein requiring no new capital asset purchases or upgrades to make the manufacturing plant on-demand prepared. Furthermore, the number of production lines required for a factory to become on-demand capable is minimized as the automation of the tooling is responsive to the optimized solution and can accommodate all types of production requirements from mass quantities to one-off, specialty, and part cuts.

The NPP features technologies common to all traditional decorative panel and panel-content furniture manufacturers. Upon installation of the presently described NPP, legacy furniture manufacturers are given a digital core that enables factories to transform their legacy manufacturing equipment into advance furniture manufacturing technology. The herein described NPP constitute a common bridge that furniture manufacturing companies cross to transition from traditional responsive manufacturers to real time on-demand production facilities. Moreover, the herein described NPP interconnects the entire on-demand furniture supply chain of dozens of now separate and siloed functions and facilities.

The NPP construct is driven by a computer based mathematical model of each manufacturing facility's workplace. The starting point of the NPP is the input of factory data and production of optimized schedules of furniture parts patterns, order buckets, orders and order groups that conform to factory constraints and operating rules. Successful NPP implementation results in optimized output that reflect and conforms to the factory's constraints and operating rules. As order specifications are received by the NPP enabled facility over a wide area network, NPP software acts as each factory's agent for receiving and fulfilling orders.

The NPP algorithm enables more efficient furniture manufacturing by providing optimized solutions for on-demand, unique customer orders while also respecting and optimizing each specific manufacturer's defined critical metrics. Additionally, the NPP enables the furniture manufacturing infrastructure and equipment assets to drive manufacturing facilities to more efficiently produce cut to size parts, automatically retools machinery configuration, and establishes the underlying technology for collaborative robotics that will replace electromechanical devices and reduce or eliminate labor handling costs.

The NPP systems and methods described herein can be used in individual, stand-alone, manufacturing plants. However, NPP can be leveraged through a Unified Data Center (UDC) for creating a demand and order exchange that interconnects manufacturers and consumers in a real time network. The UDC is driven by the Cleared Path Manufacturing (CPM) paradigm. CPM utilizes algorithms in concert with UDC algorithms to allocate incoming customer orders to manufacturers that can fulfill orders based on the customer's parameters of price and timely delivery of the furniture. Resources to complete an order or a manufacturing job batch on hand by a single factory or across multiple factories are allocated in a particular manner in order to arrive at the most efficient or clearest path to fulfil an order.

The presently described systems and methods also incorporate a services component that utilizes multidisciplinary experts to support manufacturers and other constituents participating in the virtual fulfillment exchange in order to more efficiently receive, process and fill custom, made to order furniture. Founders' Solutions & Services (FS&S) is staffed by multidisciplinary experts dedicated to every conceivable cost-saving, business-building & time-preserving service exploitable in this virtually interconnected ecosystem. FS&S also intercepts, collects, prioritizes & translates data into a compass, a predictor and/or prescription. CPM manufacturers have access to the use of an FS&S facility and its continuous improvement program. FS&S programmers will assist or be responsible for factory IT changes & assist in factory installations when requested. FS&S offers asset utilization ratio tracking to measure improvement efforts. The network of CPM factories puts manufacturing consumables costs at maximum discount levels while rebuilding suppliers' businesses.

New Pier Platform (NPP) creates a database of optimized simulations/solutions encompassing the manufacturing workplace (materials inputs to finished product) producing each parts order every way mathematically possible while respecting each manufacturing plant's unique, specified metrics and management operating rules. Optimization includes the metrics that influences time/costs in all combinations.

Simulated solutions that the NPP calculates is the enabler required by manufacturers in order to respond to: (a) quoting an on-demand order, (b) producing an on-demand order, and (c) streaming on-demand data to other databases. The data is structured to serve both people (3.0) and digital (4.0) networks through a specification of metrics which they seek to evaluate in optimized combinations specifying how many alternative plans are to be analyzed.

The NPP data is derived by the underlying Global Perspective Optimizing (GPO) algorithm. GPO runs hundreds of thousands or millions of equations required to optimize a production line (including ordering of materials from inventory stores, automatically reconfiguring the saws and line equipment, determining the finished product next stage including assembly, flat pack-out or palletizing for overland carrier to the next factory).

There has thus been outlined features of the invention in order that the detailed description thereof that follows may be better understood and in order that the present contribution to the art may be better appreciated.

BRIEF DESCRIPTION OF THE DRAWINGS

The invention and a preferred mode of use, further objectives and advantages thereof, will be best understood by reference to the following detailed description of illustrative embodiments when read in conjunction with the accompanying drawings, wherein:

FIG. 9A depicts patterned saw book arrangement corresponding to a batch job order according to an embodiment of the present invention.

FIG. 9L depicts patterned saw book arrangement corresponding to a batch job order according to an embodiment of the present invention.

FIG. 9O depicts patterned saw book arrangement corresponding to a batch job order according to an embodiment of the present invention.

FIG. 10 is a presentation in tabular format of data pertaining to a batch job order according to an embodiment of the present invention.

FIG. 11A is a presentation in tabular format of data pertaining to a batch job order according to an embodiment of the present invention.

FIG. 11B is a presentation in tabular format of data pertaining to a batch job order according to an embodiment of the present invention.

FIG. 11C is a presentation in tabular format of data pertaining to a batch job order according to an embodiment of the present invention.

FIG. 12A is a presentation of product piece offloading data pertaining to a batch job order according to an embodiment of the present invention.

FIG. 12D is a presentation of product piece offloading data pertaining to a batch job order according to an embodiment of the present invention.

FIG. 12E is a presentation of product piece offloading data pertaining to a batch job order according to an embodiment of the present invention.

DESCRIPTION OF THE EMBODIMENTS

Figure 1A:
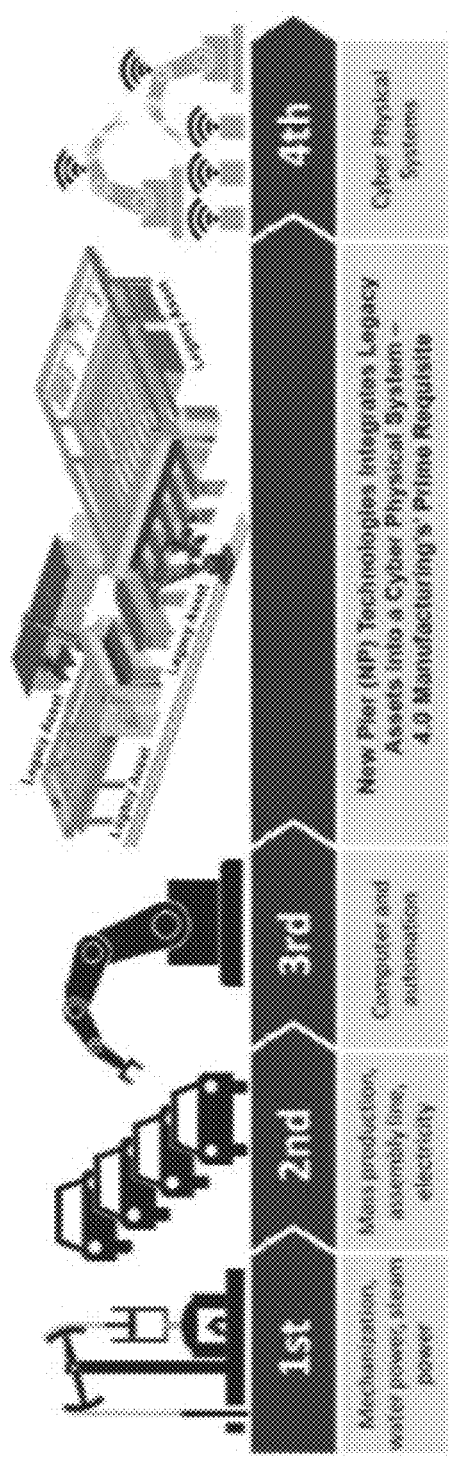
FIG. 1A is a diagram depicting the various generations of furniture parts and component manufacturers.

The six-pack of patterns is exclusive to the NPP and depends on a combination of GPO software powered by parallel processing. Through the use of GPO software, book-sawn flat panel stock can be cut into patterns for rectangular furniture part sizes while providing guillotine-cuts and further control detail pattern configurations needed to conform to processing machinery design limits. FIGS. 1B, 1C and 1D depict the various cuts performed according to the six-pack of patterns. These include long rip cuts 102, length head cuts 104, cross head cuts 106, partial head cuts 108, short rip cuts 110 and tertiary cuts 112. As seen in FIG. 1E, a three dimensional multi-pattern saw book 116 is provided in which three distinct saw books 118 are cut according to various patterns 114 and requirements. The six-pack of patterns enables factories to achieve equal or near-equal material utilization as traditional nesting while enabling a high volume production line such as CPM. Production lines that use "nesting" are one panel-at-a-time production lines from end to end with one sizing head. As a result, nesting lines have very low output. NPP's GPO six-pack patterning removes the need to consider a second sizing line to produce quantities of one or two pieces.

NPP's GPO six-pack patterning also prevents excess material (for example, an overage of furniture parts) from accumulating on the factory's floor during processing. A parts-free floor follows critical operating for software-driven on-demand production from the "one-off" to any number of copies. No parts in-process are laying on the floor unidentified.

Simulation of the optimized workplace or factor in three dimensions satisfies other on-demand production requirements, including eliminating finished parts inventory; eliminating in-process parts inventory; eliminating finished product showroom inventory by offering furniture on-demand; creating an indifference to repeat orders for purposes of exhausting finished parts inventory; eliminating parts overages in the optimization process while simultaneously eliminating underage; enabling specified overage allowances to compensate for predicted parts damage; maximizing material utilization and minimizing loss; maximizing book sawing efficiency and minimizing capital encumbrance.

The GPO approach to optimizing furniture parts manufacturing includes a first step that generates all of the optimized alternative production plans that a given factory can physically produce. There could be as many as $1 \times 10^{100}$ or more different and competing production plans within a factory. An alternative production plan is one simulation of the optimized manufacturing workplace of a specific factory for one group of parts that makes up a manufacturing batch. A database of all alternative plans for each batch insures availability of the best plan for meeting the optimization requirements and predicting needs of the factory. Importantly, the remaining steps beyond the first step in the processing of an order of supplying of data be "multiple choice" as opposed to a step that involves optimized results because the orchestrating virtual network takes place in real time. On the other hand, optimized results may or may not be processed quickly enough to be accepted as real-time.

The second step pertains to choosing an alternative production plan best suited for its intended purpose. A common choice is made for a production plan that best suits the needs of a factory at a given time. A quote in pursuit of an order may be another basis for choosing a given production plan. To begin the optimization process, GPO finds the first cutting pattern of the first alternative plan. This selection of the first cutting pattern triggers a GPO software learning process wherein the GPO optimization capability learns to modify its own code. GPO's optimization module adjusts code after the formation of the first optimized pattern and each subsequent optimized cutting pattern. Then, upon finalization of each alternative plan, which typically includes several cutting patterns, GPO optimization module again writes new code based on what it learned from the entire production plan results. This process of solving the same problem is repeated in view of further learning and dynamic code adjustments. The learning process that occurs elevates the quality of each fractional unit (cutting pattern) and then upon formation of each alternative production plan (several cutting patterns) elevates the quality of the fractional units and alternative plans, as the iterative optimization process continues. As the iterative process continues a point is reached in which further improvement to one manufacturing activity (like saw component movements) reduces the efficiency of one or more other activities (such as increasing replenishment storage stock beyond current capacity). The production plans immediately prior to the plan the caused saw component movements to worsen other production aspects are preserved as potential alternative plans. The potential alternative plan can be kept until further processing replaces it with another alternative plan that improves the saw efficiency without worsening the replenishment objective.

GPO generates optimized values for each of multiple activities without worsening any of the other optimized values in the collection of values being optimized simultaneously. In it this optimization process that is valuable in the parts manufacturing process where a single solution does not optimize all values. In sum, the optimization process begins with a complex program template that is then self-modified according to what it learns while optimizing in order to arrive at the optimal way to manufacture all parts in one batch in view of all combinations of metrics, first to last.

GPO includes winnowing software that enables factory practitioners and code writers to assume control of its new GPO generated data upon installation. Alternatives for part production may be selected in view of on-demand order fulfillment requirements.

When using floating-point numbers, traditional software for optimizing cutting patterns for furniture parts (known as Simplex) accumulates arithmetic rounding errors at each step. With Simplex, the only option to counter rounding errors is to limit the number of parts to be optimized to fewer than most order buckets contain or use floating point numbers and accumulate rounding errors. Rounding errors are inherent in floating point calculations. Accrued rounding errors make later calculations inaccurate or at least of uncertain accuracy. GPO's software avoids accumulations of rounding errors by replace Simplex' whole-order bucket optimization with optimizing each order bucket in fractional units (i.e., one cutting pattern at a time). While Simplex optimizes all cutting patterns in an order bucket simultaneously via step-by-step simultaneous linear equations, GPO optimizes an order bucket one cutting pattern at a time. A cutting pattern, as GPO's fractional unit, prevent accumulation of rounding errors.

Figure 1B:
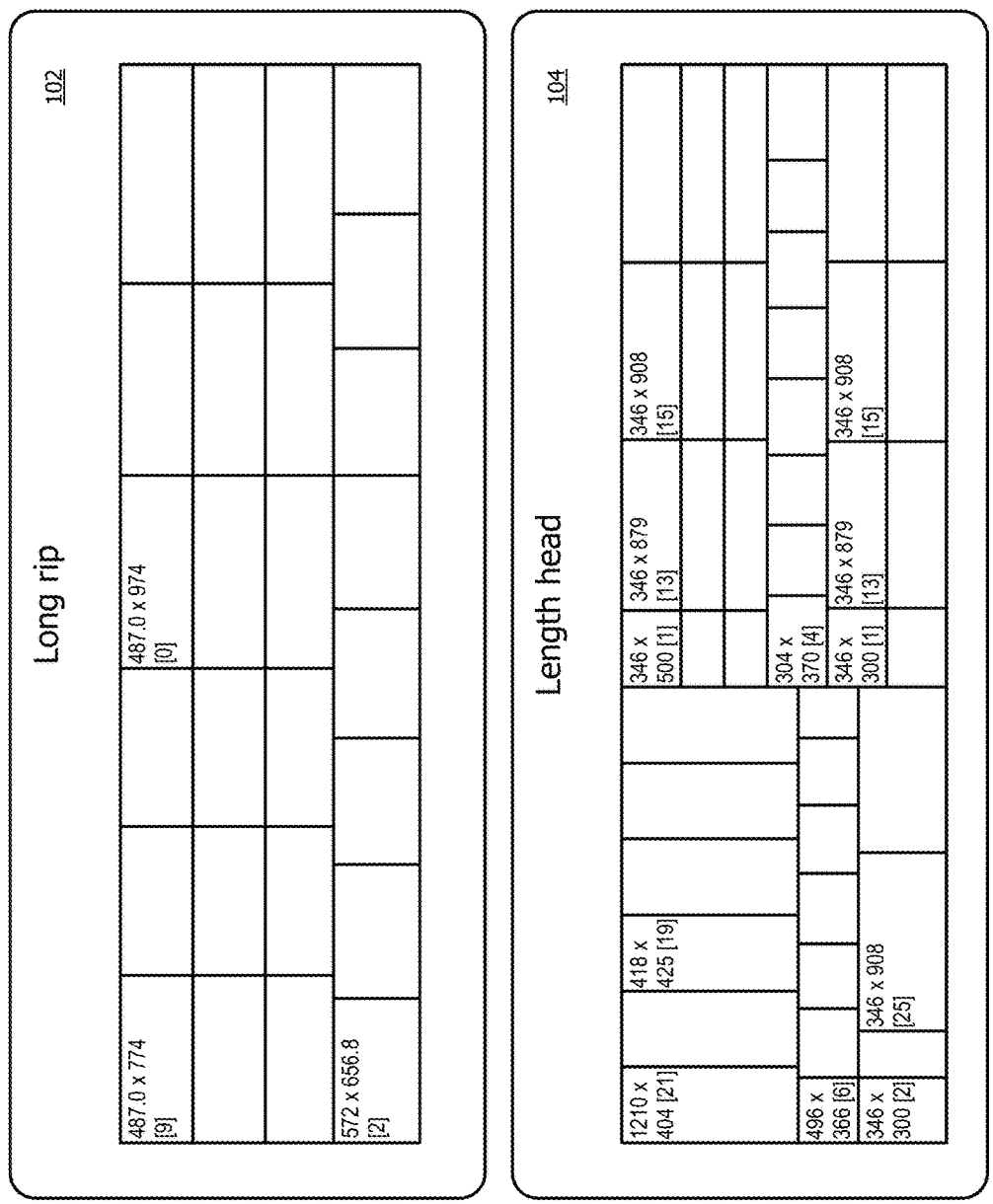
FIG. 1B depicts saw patterns according to an embodiment of the present invention. is a diagram depicts the New Pier Platform six-pack of 4.0 cutting pattern style and 3D capabilities.
Figure 1C:
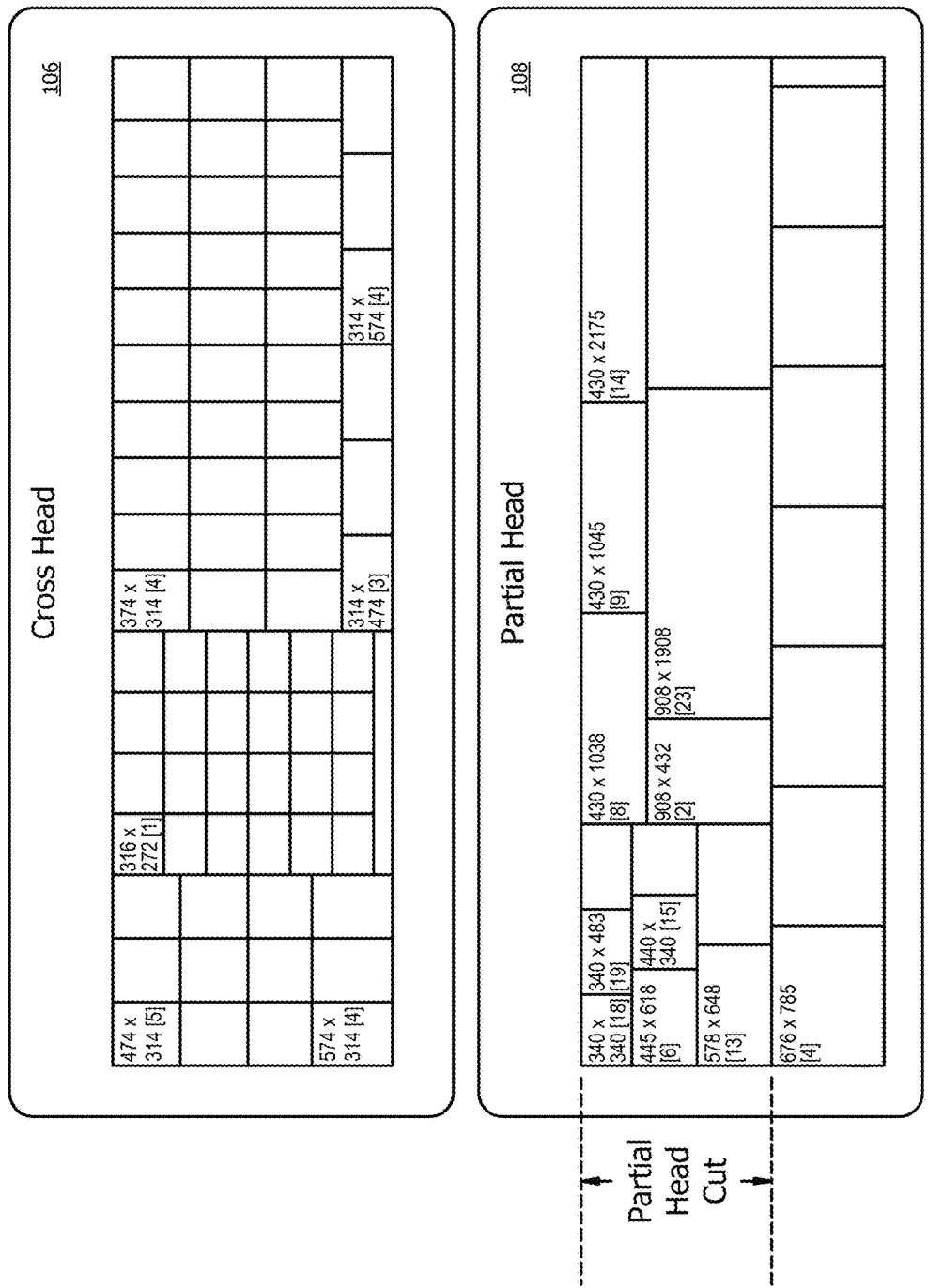
FIG. 1C depicts saw patterns according to an embodiment of the present invention.
Figure 1D:
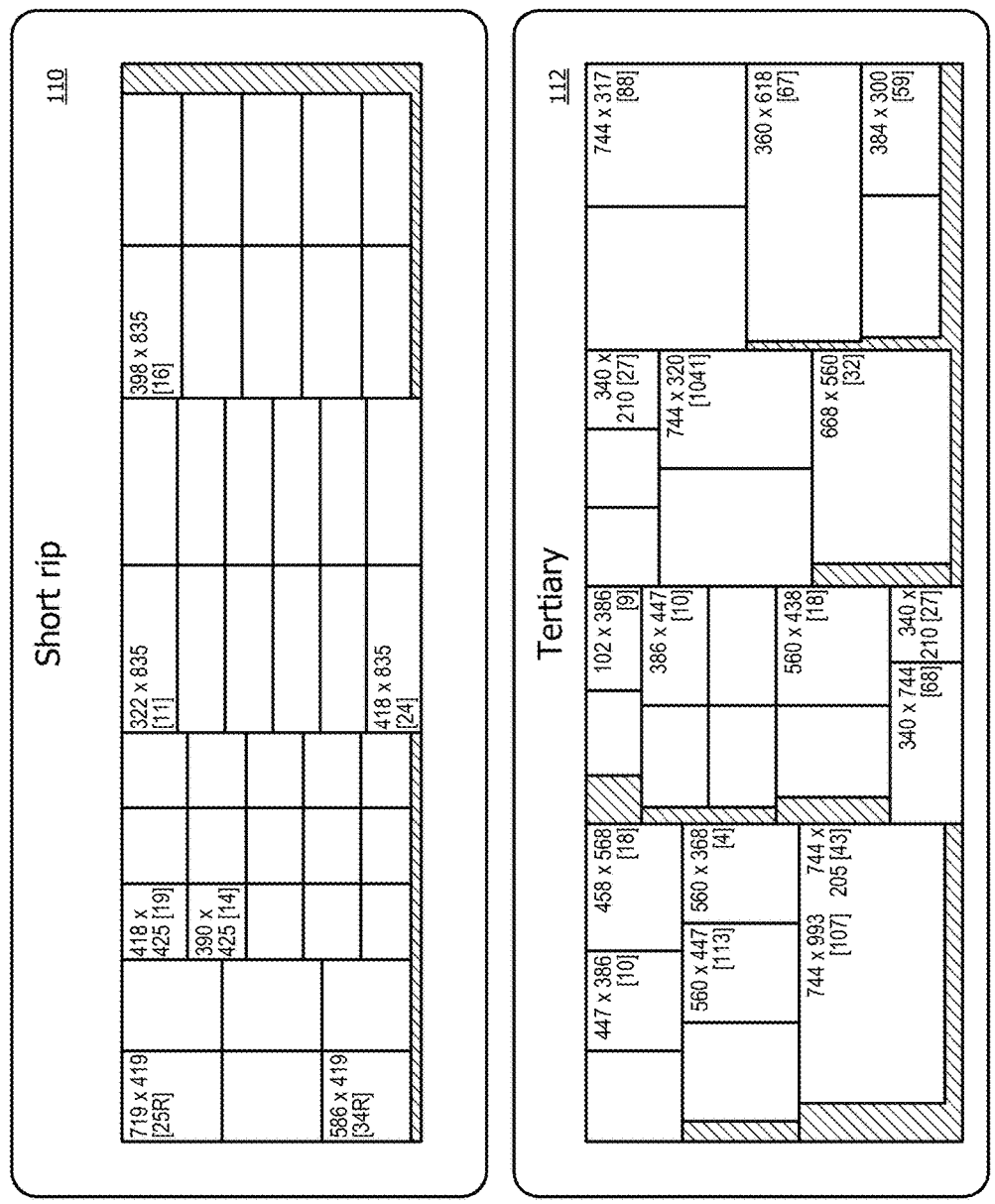
FIG. 1D depicts saw patterns according to an embodiment of the present invention.
Figure 1E:
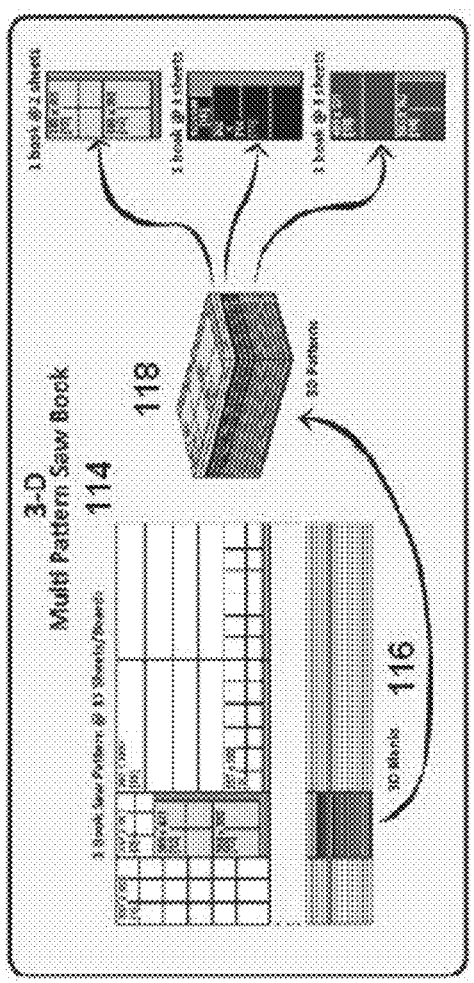
FIG. 1E depicts a three dimensional multi-pattern saw book according to an embodiment of the present invention.

FIG. 1A depicts the various generations of furniture parts and component manufacturers. With each generation of furniture production has undergone technological advancements. From the first generation and the use of water and steam power, to the second generation mass production using electricity to power assembly lines and the third generation of furniture production utilizing automation, including electromechanical robotics, and data processing capability. In the current third generation, advancement came with the connection of the manufacturing plant via the Internet within a plant's assets. Optimization of the manufacturing plant is calculated via algorithms, however, computing power in the third generation was limited allowing only two-dimensional math. With the dawn of the fourth generation, Industry 4.0, computing power has vastly improved which allows for greater depth of the simulations/solutions in three dimensions (FIGS. 1B-1E). New Pier Technology Platform includes a new six-pack of 4.0 cutting pattern styles and 3D capabilities. The combination of six cutting pattern styles and three dimensional capabilities, exclusive and unique to the NPP of Technologies, is essential for manufacturers (1) to use the proven most cost effective 'book sawing' and legacy book cutting saws while producing on-demand unique customer orders; and is essential for book cutting saws; and (2) to cut to size wood panel furniture parts from book patterns while exactly matching quantities required with quantities patterned while simultaneously maximizing book heights and minimizing material waste. This depth of furniture parts workplace optimization enables every mathematically viable solution specific to each factory to be generated and stored in each factory's private database.

Figure 2:
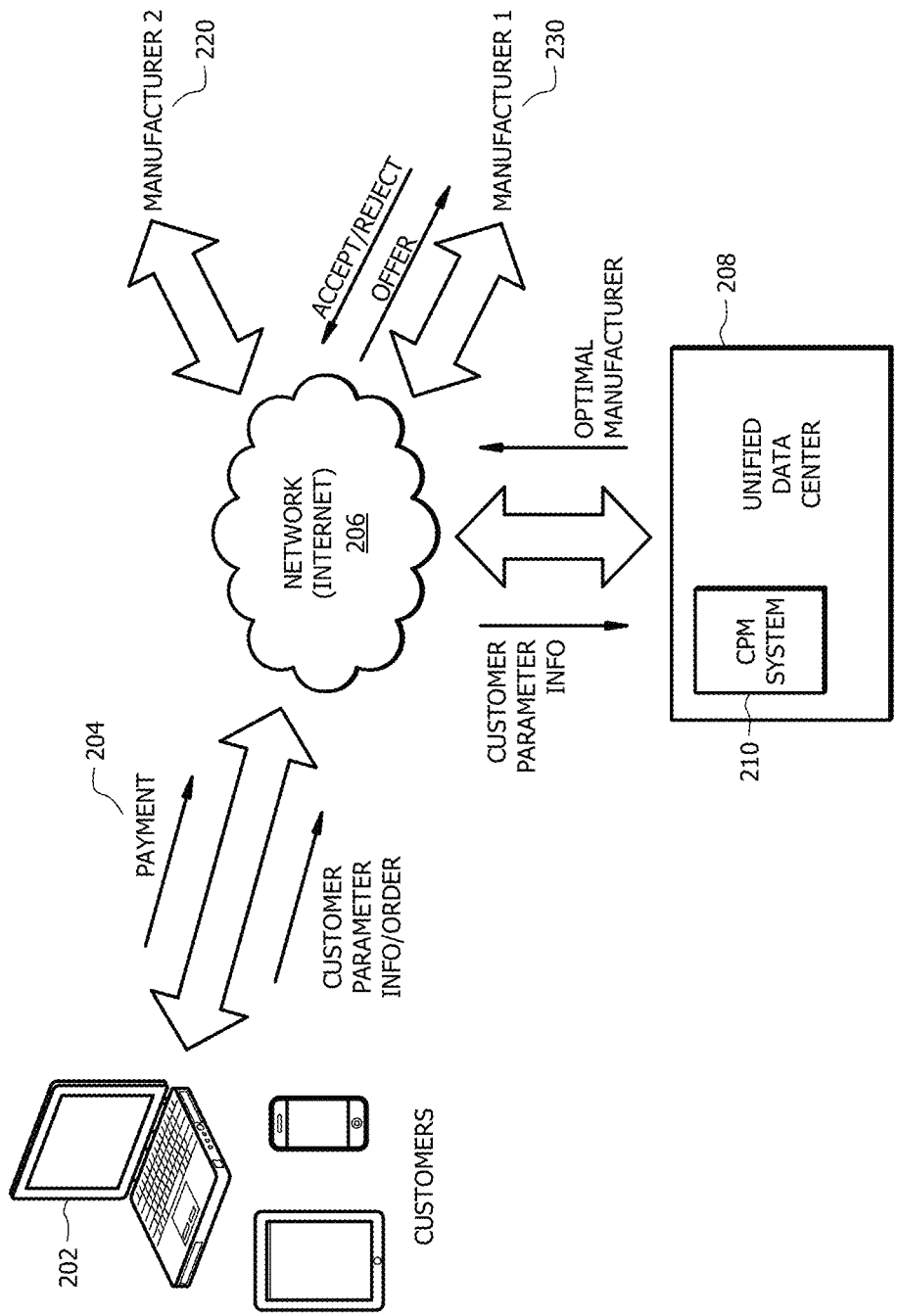
FIG. 2 is a network diagram of a furniture manufacturing platform according to an embodiment of the present invention.

FIG. 2 depicts a network diagram illustrating a Virtual Network for on-demand production in which communications pathway between one or more computer devices and one or more servers can be established. In FIG. 2, the consumer computer device 202 is configured to establish a communication link 204 with processing devices such as other computing devices as well as local and remote servers and databases that are discussed further below.

The computer device can be configured to communicate via a single or a plurality of communication networks 206. In one embodiment, the network can include communication networks that are commonly used in homes, offices, intranet and Internet which include the local area network (LAN) or a wide area network (WAN). WAN networking allows for the use of a wireless network card, modem, Ethernet card or other mean of communication such as the Internet. In a LAN network, the computer can be connected via a local network. A data repository referred to as a unified data center 208 that provides data to the CPM system 210 is a storage facility for historic manufacturing data for CPM systems in a single factory or across multiple factories. The data stored in the unified data center or UDC serves many functions but is primarily used to provide factory furniture process optimization according to various parameters associated with a particular factory or a plurality of factories. These parameters include availability of subsystems that participate in the furniture manufacturing process, environmental conditions of the factory or of subsystem components as detected by various sensors that continuously provide data to the unified data center. On-demand order requirement and resource availability are also parameters that determine an optimal path for furniture manufacturing.

The data in unified data center is also processed by CPM processors, in conjunction with machine readable code, that makes predictions as to furniture supply and demand. These supply and demand determinations are relied upon in the CPM system determining which of the six sawing patterns and what configuration of a multi-pattern book will yield a desired result in view of operating conditions at that moment in time.

Data stored in unified data center 208 also is by the CPM system to best match customer on-demand order requirements with the manufacturer that appears most able to meet the customer's requirements in terms of product type, price, time, etc. The CPM associates customers with a preferred manufacturer based on parameter information entered by the customer. Parameters can include factors such as the design or style of the furniture, fabric of the furniture, size of the furniture or the delivery date of the furniture and price. The system then looks at backlogs and tooling availability to identify the manufacturer(s) best positioned to fulfill the on-demand orders placed by the customer. This eliminates the bottle-neck effect common in the single source manufacturing scenario. Through the present platform, an optimal manufacturing path is selected from among many possible paths among participating manufacturers. The CPM system 210 also communicates with manufacturers over the wide area network 206 to manufacturers 220 and 230 to retrieve real time and historical data from those manufacturers, provide software updates and provide manufacturing optimization information.

Figure 3:
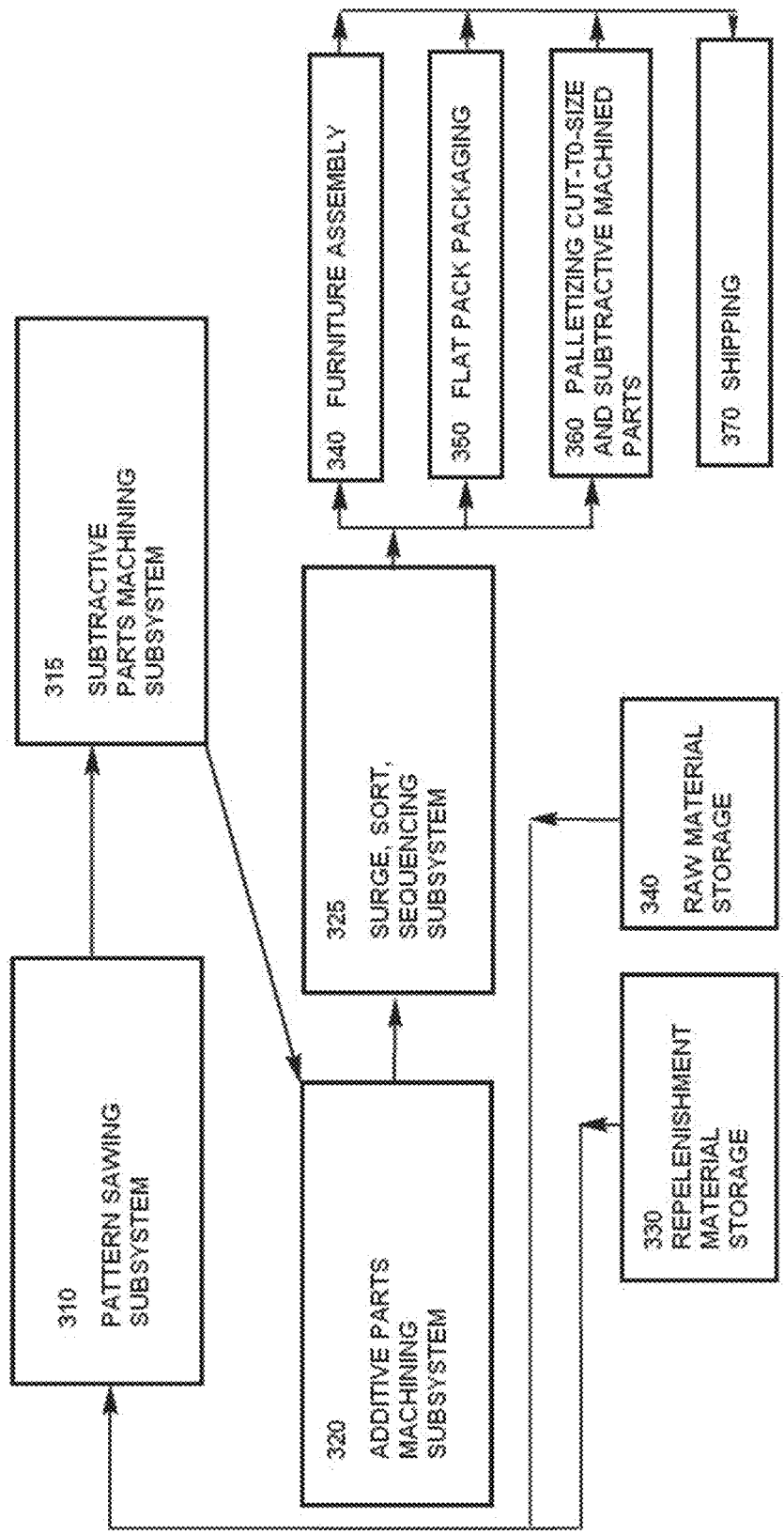
FIG. 3 depicts the subsystems of a furniture manufacturing platform according to an embodiment of the present invention.

FIG. 3 describes the major subsystems of the CPM paradigm for on-demand furniture manufacturing. In FIG. 3, a replenishment material storage facility and a raw material storage facility are provided. Replenishment materials describe extra partially or fully completed furniture parts made to order that serve to replace damaged or unacceptable furniture parts manufactured according to the CPM system of the present invention. Data representing an actual level of replenishment materials and raw materials available is stored in the CPM's unified data center. Note that the unified data center can include data indicative of resources available, facilities and machinery available from geographically distinct manufacturing facilities. The materials data is provided to the CPM Pattern Sawing Subsystem (PSS) 310 module, which includes processing capabilities and software and serves as the lead process in CPM manufacturing. PSSM 310 generates the task responsibilities for all working units of the CPM, including itself. From a manufacturing hardware standpoint, the Pattern Sawing Subsystem comprises one of many brands of similar saw systems used in panel part manufacturing. These saw systems are adapted to automatically process the entire six-pack of saw patterns with all three dimensional variations. In one embodiment, raw material, such as wood panels, are provided from the raw material storage facility to the Pattern Sawing Subsystem 310. The Pattern Sawing Subsystem 310 is operable in a cloud based network and serves as an immediately available data supply chain that enables the building of software models of other working subsystems of the CPM system, including the Subtractive Parts Machining Subsystem (SPMS) 315, the Additive Parts Machining Subsystem (APMS) 320, the Surge, Sort, Sequence Subsystem (SSSS) 325, Replenishment Material Storage 330 and Raw Material Storage 335, as well as end of line solutions pertaining to assembly 340, packaging 350, palletizing 360 and shipping 370.

Figure 4:
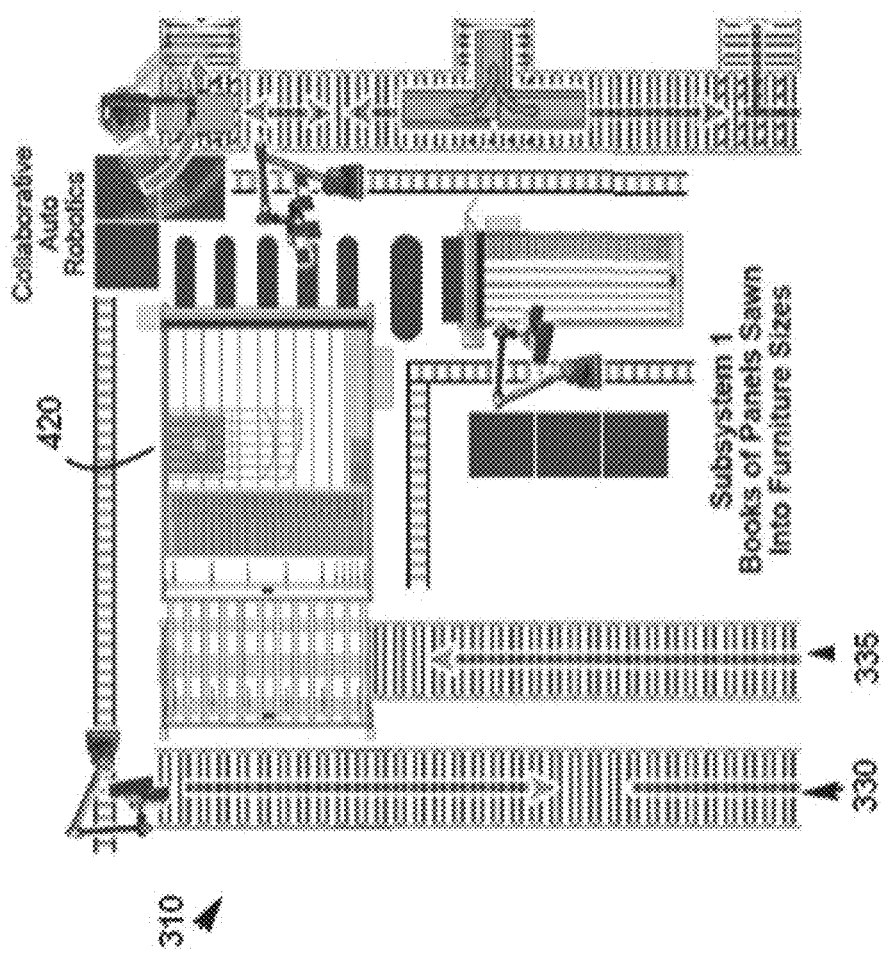
FIG. 4 depicts a subsystem of a furniture manufacturing platform according to an embodiment of the present invention.

A more detailed view of PSS 310, SPMS 315, APMS 320 and SSSS 325 is provided in FIGS. 4-7. FIG. 4 depicts a detailed view of the PSS 310, which is the gateway to the optimized manufacturing process of the CPM system of the present invention. The PSS includes the six-pack three dimensional saw book capability described above with respect to FIG. 1E. The six-pack saw book system 410 receives raw materials from raw material storage facility 335 and according to the various sawing patterns saws furniture panels to various sizes according to furniture specification. The PSS has an associated rails system on which raw materials and sawn panels are transported by collaborative auto robotics units to the SPMS 315 subsystem for further refinement or to the replenishment storage facility 330 for future use. SPMS 315, as discussed above, includes a module that includes a processor and machine readable program code that with the CPM's data supplied by the unified data center (FIG. 2) drives the SPMS 315 as a simulator for the CPM's subsystems. That is, while SPMS 315 fulfils physical requirements of the CPM in terms of processing books of panels sawn into furniture sizes, it collects data associated with the operations of the other subsystems and directs the operations of the other subsystems according to collected data, analysis of historical data, alternative path selections, and other operating conditions, including those measured by environmental data collected from sensors associated with the various subsystem components along the manufacturing line. SPMS 315 acts in this capacity through software that establishes rules to best optimize the other subsystems as well as the end of the line operations (assembly, packing, shipping) and replenishment material and raw material storage.

Figure 5:
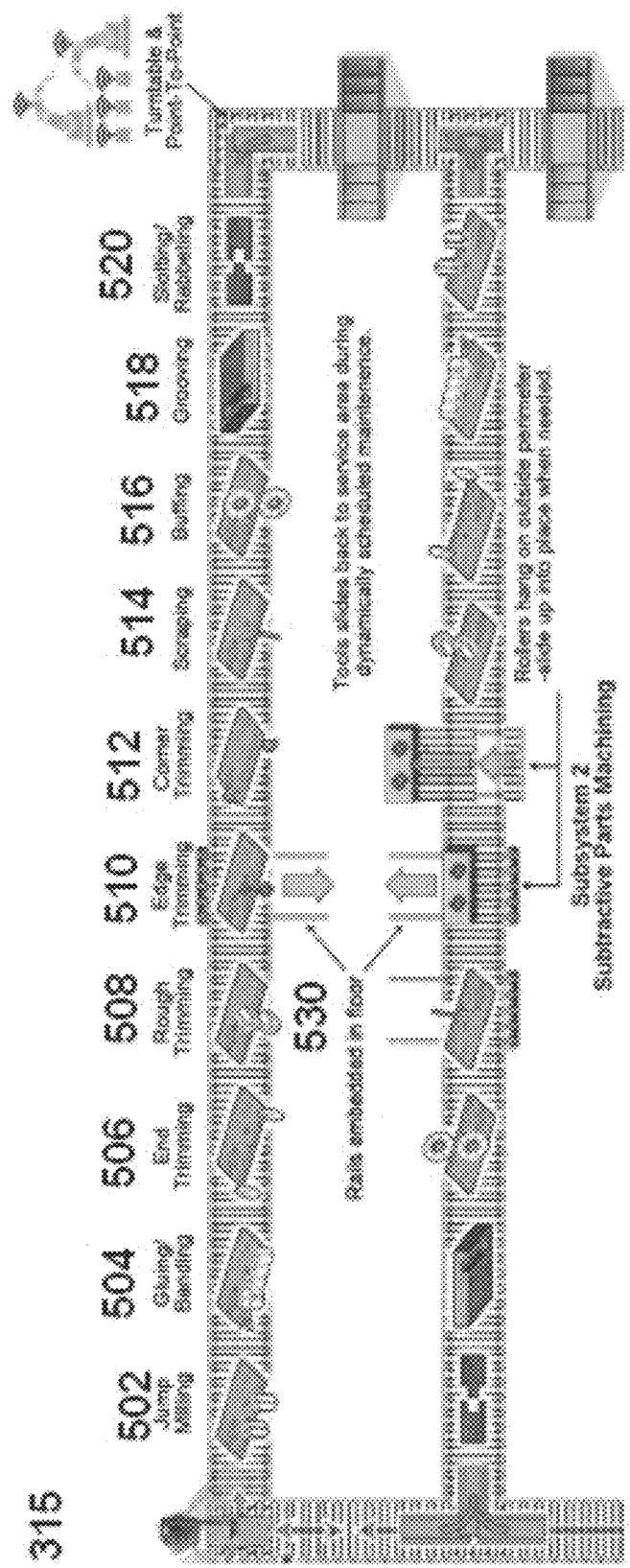
FIG. 5 depicts a subsystem of a furniture manufacturing platform according to an embodiment of the present invention.

FIG. 5 is the SPMS 315, in which particular aesthetic features are applied to the sawn panels received from PSS 310. SPMS 315 includes a plurality of functional units for jump milling 502, gluing/banding 504, end trimming 506, rough trimming 508, edge trimming 510, corner trimming 512, scraping 514, buffing 516, grooving 518 and slotting/rabbeting 520. The various tooling for these subtractive parts machining operations are on rollers that allow the needed tooling to slide into place along associated rails 530 when the specific machining operation is to be applied to a sawn panel. In addition, the various tools slide along the rails to a service area for dynamically scheduled maintenance.

Figure 6:
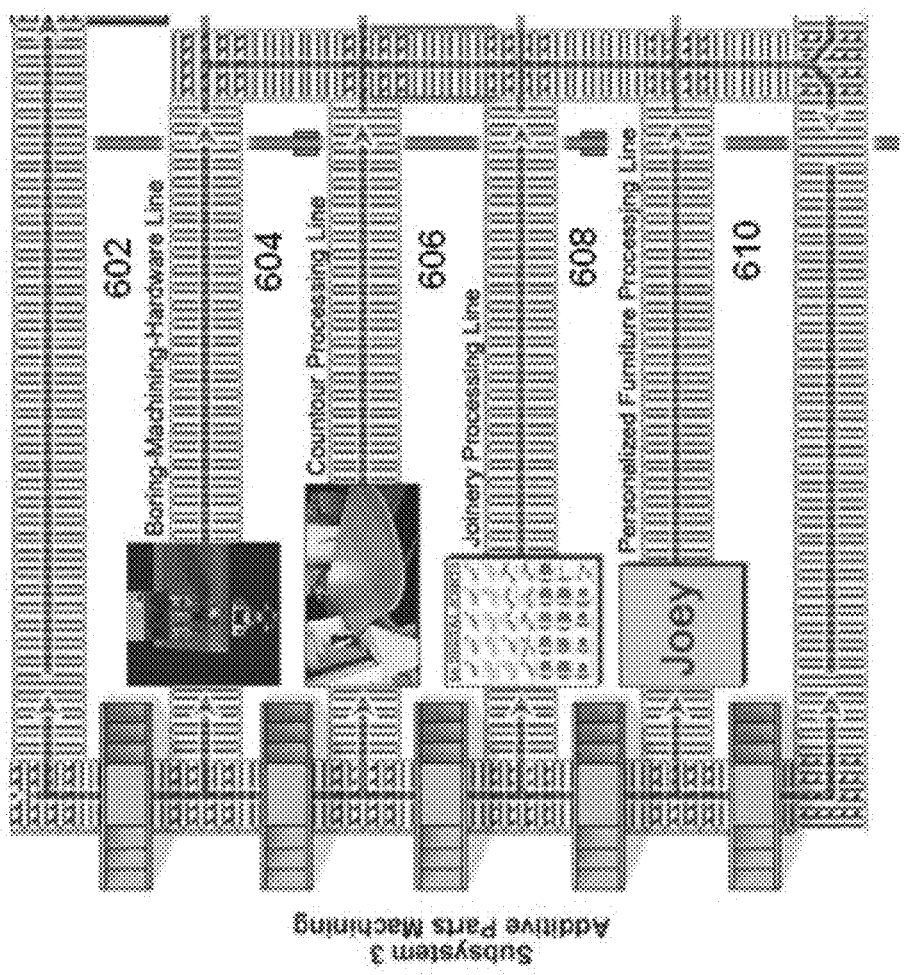
FIG. 6 depicts a subsystem of a furniture manufacturing platform according to an embodiment of the present invention.

FIG. 6 is the APMS 320 that includes tooling along separate lines to provided additive parts machining to sawn furniture panels received from the SPMS 315 or directly from PSS 310. APMS 320 includes a boring-machining-hardware line 602, a contour processing line 604, a joinery processing line 606 and a personalized furniture processing line 608. Each of these lines add customization to the received sawn panel as part of fulfillment of on-demand orders.

Figure 7:
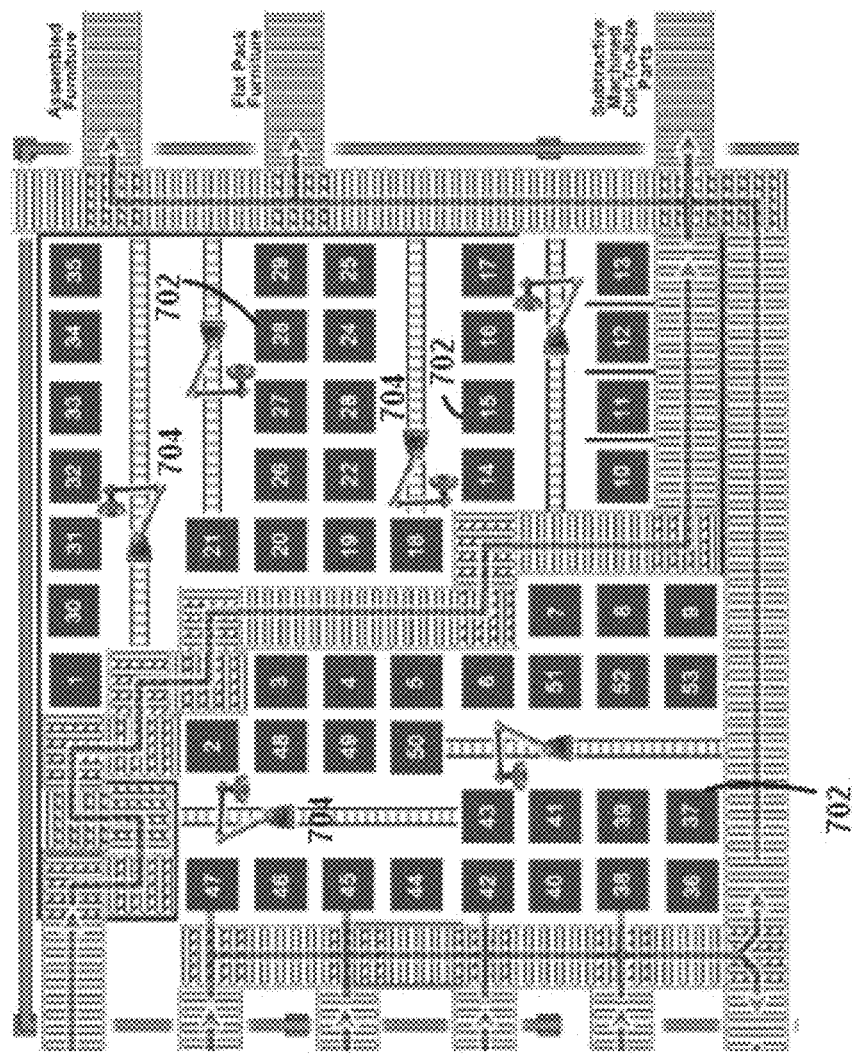
FIG. 7 depicts a subsystem of a furniture manufacturing platform according to an embodiment of the present invention.

FIG. 7 is a detailed view of the surge, sort, sequencing subsystem (SSSS) 325. SSSS 325 can be considered the "nerve center" of CPM. SSSS 325 presents the familiar maze problem associated with manufacturing. That is, various stations within SSSS 325 both receive furniture panels sawn, subtractive machined or additive machined from subsystems upstream and deliver processed furniture panels to end of the line operations for assembly, packaging, palletizing and shipping or for storage as replenishment material. Recall that the CPM eliminates piecemeal, serial construction of furniture manufactured from sawn panels. With this, the need for large inventories is gone. Through the CPM's unified data center (FIG. 2) that uses data and customized software for predictive modeling of a manufacturing factory's requirements and the requirements across factories to determine the optimal path for construction, assembly and shipment of on-demand furniture orders. The CPM's predictive modeling software determines at the time of a customer order the factory best positioned to fulfil the order according to the specific requirements of the customer. This determination is also a function of predictions based on historical data of future requirements of a particular manufacturer operating according to the presently described CPM system.

In this vein, data associated with SSSS 325 includes the quantity of parts available at a factory or among multiple factories that relate to a particular furniture item of interest. In FIG. 7, fifty three finished part locations 702 are arranged in maze-like fashion within SSSS 325. Each finished part location 702 is accessible by robotics equipment to remove finished parts from the location or place parts in the location. In one embodiment, various finished part locations 702 are in direct association with one or more of the previous subsystems via a path of travel for a part so that according to instructions a finished part may initially be placed in a finished part location without robotic device 704 intervention. In these circumstances, robotics are used to relocate a finished part to a second or subsequent location.

In operation, and according to the rules associated with the optimal path selected for a batch order, a furniture panel emanating from one or more of the PSS 310, SPMS 315 and APMS 320 can be placed in the finished part location 702 according to a plurality of parameters associated with data stored in the unified data center of the CPM. These parameters include a furniture type and the processing that the subject sawn panel has undergone. For example, certain finished furniture parts can be destined for flat pack furniture packing processing. In these instances, finished part locations 702 in close proximity to the flat pack furniture processing location will be selected for placement of the newly manufactured part. In addition, current supply of similar parts or robotics availability in a particular region of the subsystem can dictate that the newly manufactured part be located at a more remote finished part location 702 or destined for material replenishment storage. In other examples, a finished part may have been subtractive machined or is a cut-to-size part that is subject to different end of the line processing and is placed in a finished part location 702 most conducive to such end of the line processing.

Figure 8:
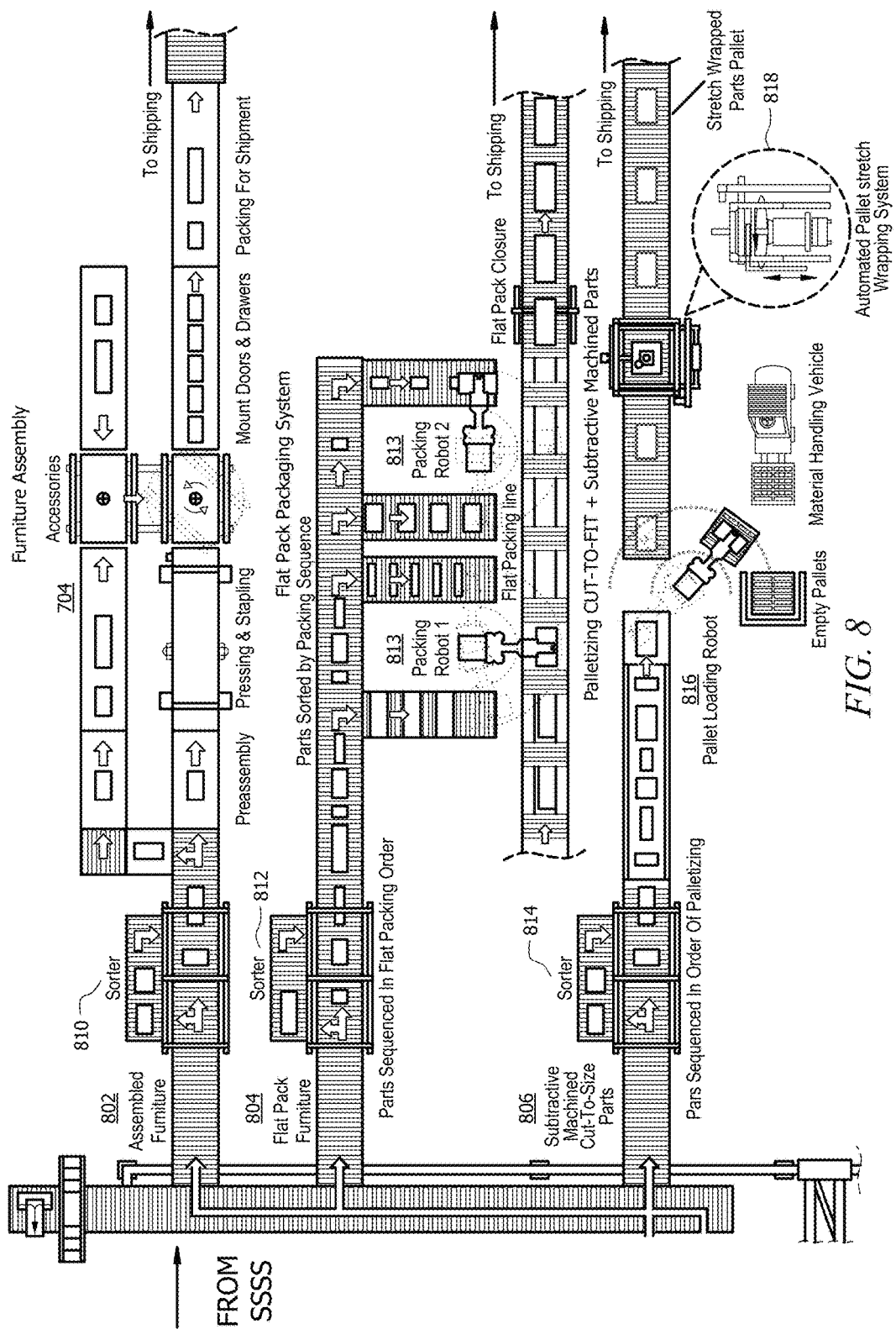
FIG. 8 depicts end of line functionality of a furniture manufacturing platform according to an embodiment of the present invention.

FIG. 8 depicts the end-of-the-line or post-panel production operations after the cut panel is selected from SSSS 325 for shipment. Once a panel is retrieved from SSSS 325, it may follow one of three paths. First, the panel may be placed on an assembly path 802 that includes a sorter 810 for sorting the various parts to be assembled. These are the panels that are to be part of a furniture product delivered as assembled. Within assembly path 802 are preassembly, pressing and stapling, mounting of doors and drawers and packing operations. Once these operations, where applicable, occur, the product is shipped to its next or final destination.

The second path that a retrieve panel may follow is the flat pack furniture path 804. On this path, finished panels are not assembled but packed in a particular sequence in a flat pack. On this path, the various panels and parts or sorted by sorter 812. Further sorting occurs according to a packing sequence, which is based on the furniture item itself and is the packing arrangement most conducive to efficient use of shipping container space and preventing product damage. Packing robots handle the parts along a flat package line and once finally packaged as required the flat package is closed by a closure mechanism and shipped to its next or final destination.

The third post-SSSS path is the palletizing path 806 for cut-to-size and/or cut-to-size+subtractive parts. These parts are sorted by sorter 814 and a number of parts are placed on a pallet by robot 816. The pallet and parts are then covered with stretch wrap by an automated pallet stretch wrapping system 818. The wrapped pallet is then shipped.

Figure 1F:
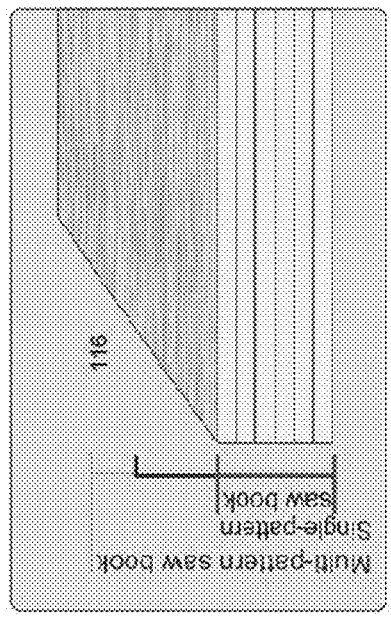
FIG. 1F depicts a single-pattern saw book and a multi-pattern saw book according to an embodiment of the present invention.

Returning to the six-pack of three dimensional book sawn cutting patterns depicted in FIGS. 1B-1E, recall that the six patterns are for long rip, cross head, short rip, length head, partial head and tertiary cuts. Each of these cutting techniques and methods for panel parts manufacturing will be understood by one of ordinary skill in the furniture panel manufacturing arts. In the dimensional multi-pattern saw book, one or more of each of a plurality of pattern types are stacked in book fashion for enabling three dimensional cutting as required to fulfill a batch order. As shown in FIG. 1E, three different books of patterns are stacked into a multi-pattern saw book. A first book comprises two sheets of one pattern type, a second book comprises three sheets of a second pattern type and a third book comprises eight sheets of a third pattern type. These three books are stacked to form a single multi-pattern saw book having thirteen sheets. As shown in FIG. 1F, a single pattern saw book has multiple sheets of a single type and a multi-pattern saw book 116 comprises more than one book with each book therein having sheets of different types than the other books therein. This arrangement allows optimization of raw materials, such as full uncut panel stock that is to be cut into rectangular furniture panels at PSS 310 and further by processed by the PSS 310 saw system conceptualized for six packing sawing or a single line traditional saw equipped with an adaptable controller.

Optimization of raw materials is achieved by virtually arranging multiple three-dimensional multi-pattern saw books within a book of full uncut panel stock to achieve a desired number of sawn panels of desired sizes while minimizing waste and cut time. As seen in FIG. 1F, a multi-pattern saw book comprising three patterns and thirteen layers achieves three dimensional sawing by causing sawing equipment under the control of a processor to make cuts according to a pattern type of a specific length and width and of a specific depth of the saw book. The processing capability of the CPM and the PSS 310 enables virtual placement of multiple saw books comprising of varying type of sheets and of varying numbers of sheets among the uncut raw material to maximize the usage of the raw material in the most timely and efficient manner. Once cut at PSS 310, the process is further optimized under the control of the CPM for further subtractive or additive machining and ultimately located as identified by the SSSS 325.

The CPM modeling techniques herein described are manifested in a one manufacturing batch example that is first processed according to the various multiple pattern saw books described above by CPM software residing, in one embodiment, in PSS 310. Data within the CPM's unified data center, that includes subsystem optimization data, raw material availability, on-demand order data, and factory subsystem availability, in addition to other environmental data collected by sensors associated with the various components of the subsystems is processed to create a manufacturing batch such as the one depicted in FIGS. 9A-9P. The batch so depicted is for cutting raw materials, which are uncut 73¼ inch×148½ inch panels as seen in FIG. 9A. The batch in the example uses seventeen saw patterns arranged in books. Pattern 1 is described in FIG. 9A, which calls for sawing of ten boards arranged in two books of five boards. Pattern 1 uses the length head pattern of FIG. 1B and uses 71³⁄₃₂ inches×148¹⁵⁄₃₂ inches of the entire raw panel. This pattern requires nine cuts per book. Other information such as loss percentage, cycle time, pattern time and number of open items are provided in connection with the pattern.

Figure 9B:
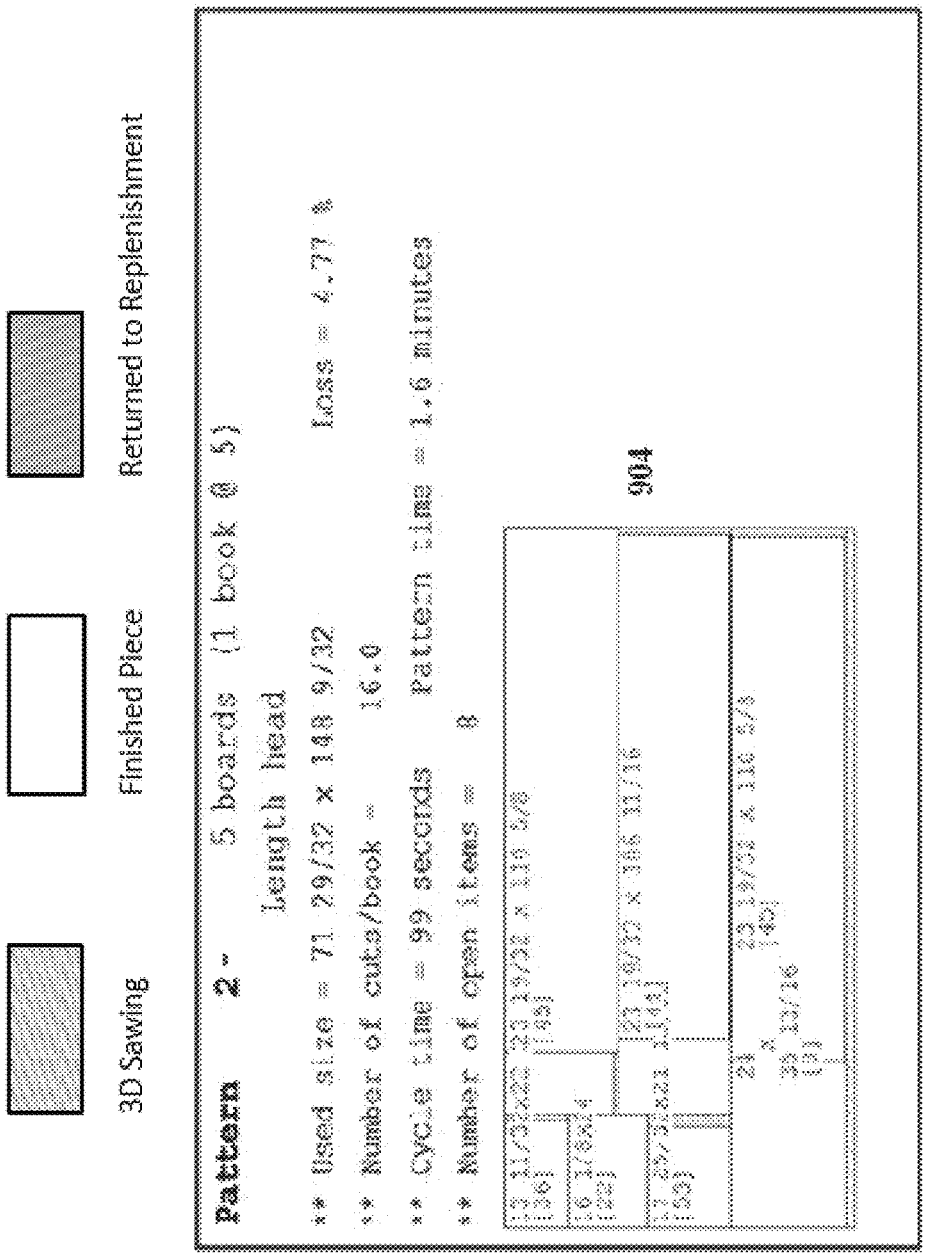
FIG. 9B depicts patterned saw book arrangement corresponding to a batch job order according to an embodiment of the present invention.

Also shown in FIG. 9A is a graphic representation of application of the saw pattern 902 to the raw panel. In FIG. 9A, the resulting cuts all result in finished pieces that may be further processed by other subsystems. Pattern 2 904 depicted in FIG. 9B is similar in that the cuts according to the pattern result in the entirety of the raw panel being cut down to finished pieces. Pattern 2 of the manufacturing batch comprises five boards in a single book and like Pattern 1 902 employs a length head cut.

Figure 9C:
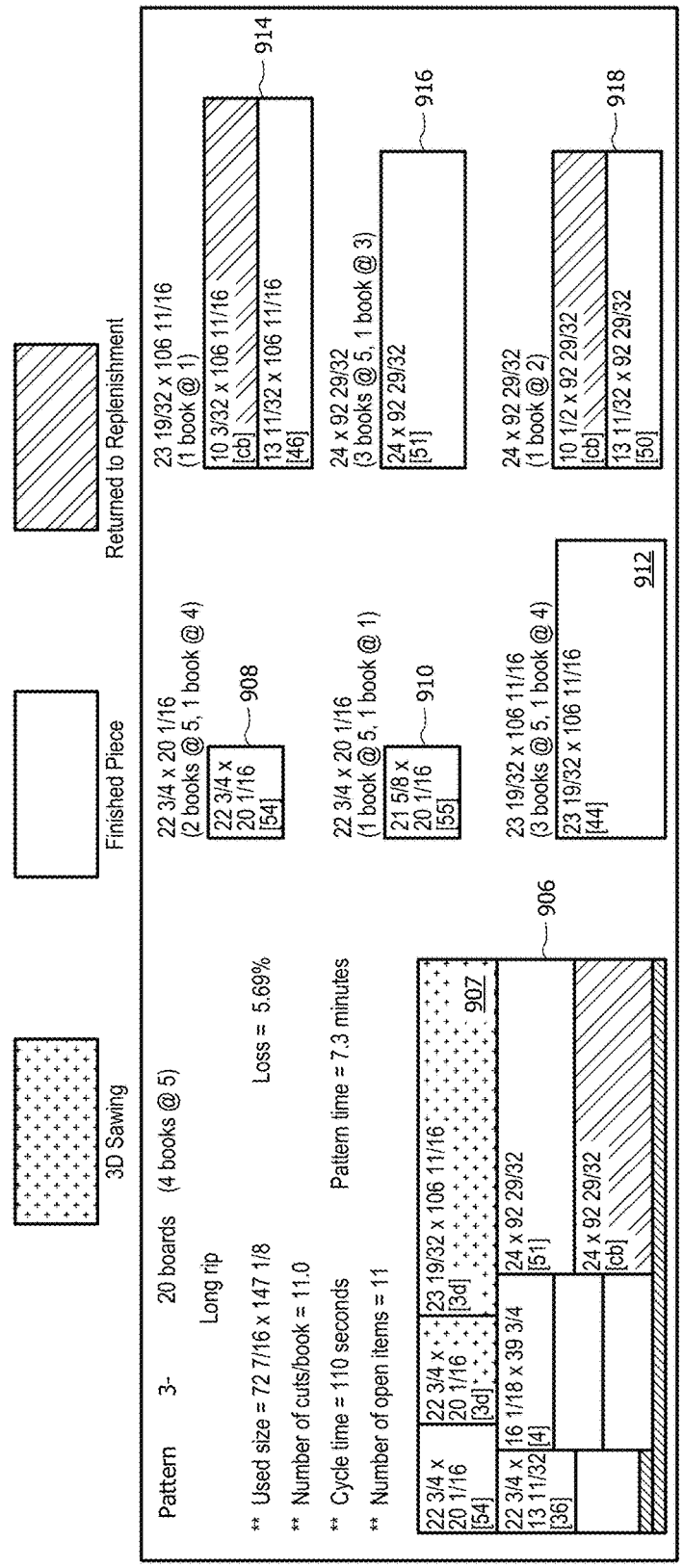
FIG. 9C depicts patterned saw book arrangement corresponding to a batch job order according to an embodiment of the present invention.
Figure 9D:
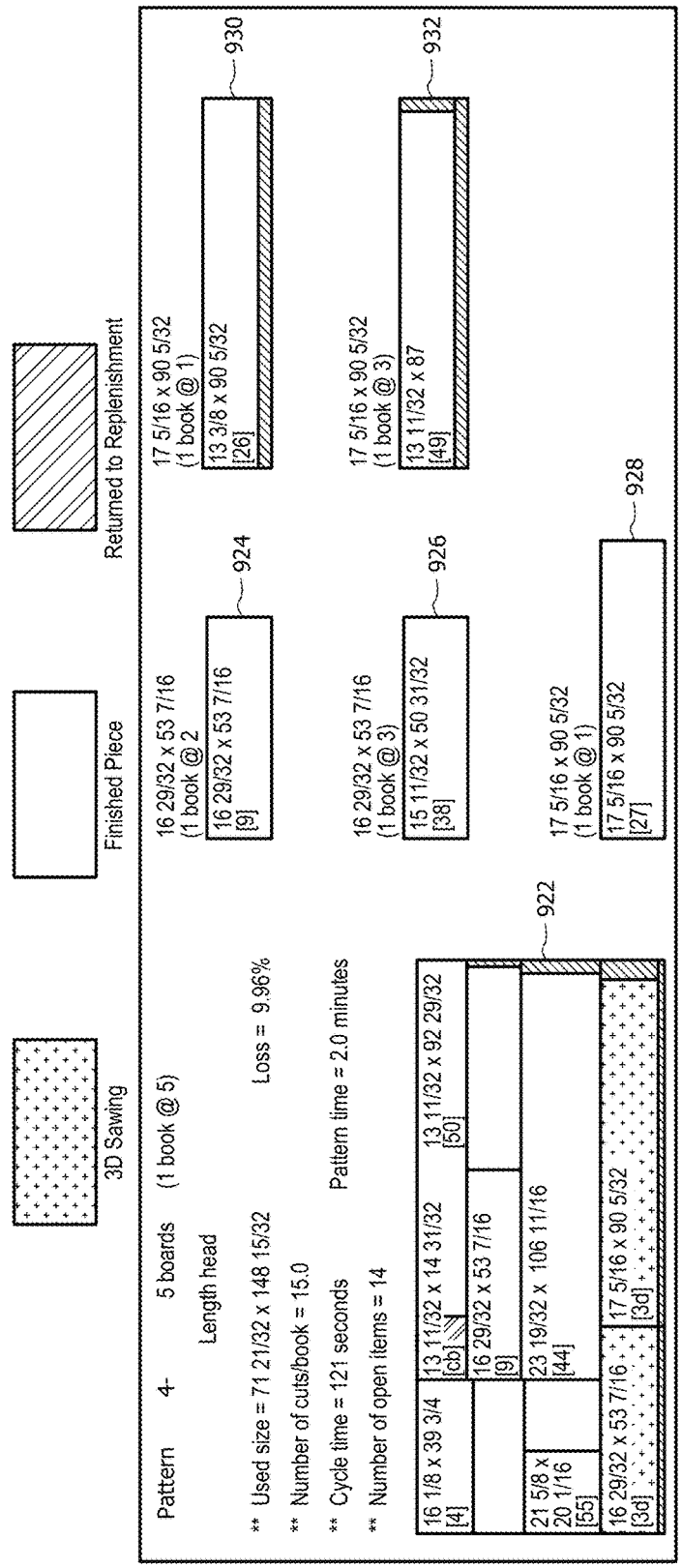
FIG. 9D depicts patterned saw book arrangement corresponding to a batch job order according to an embodiment of the present invention.
Figure 9E:
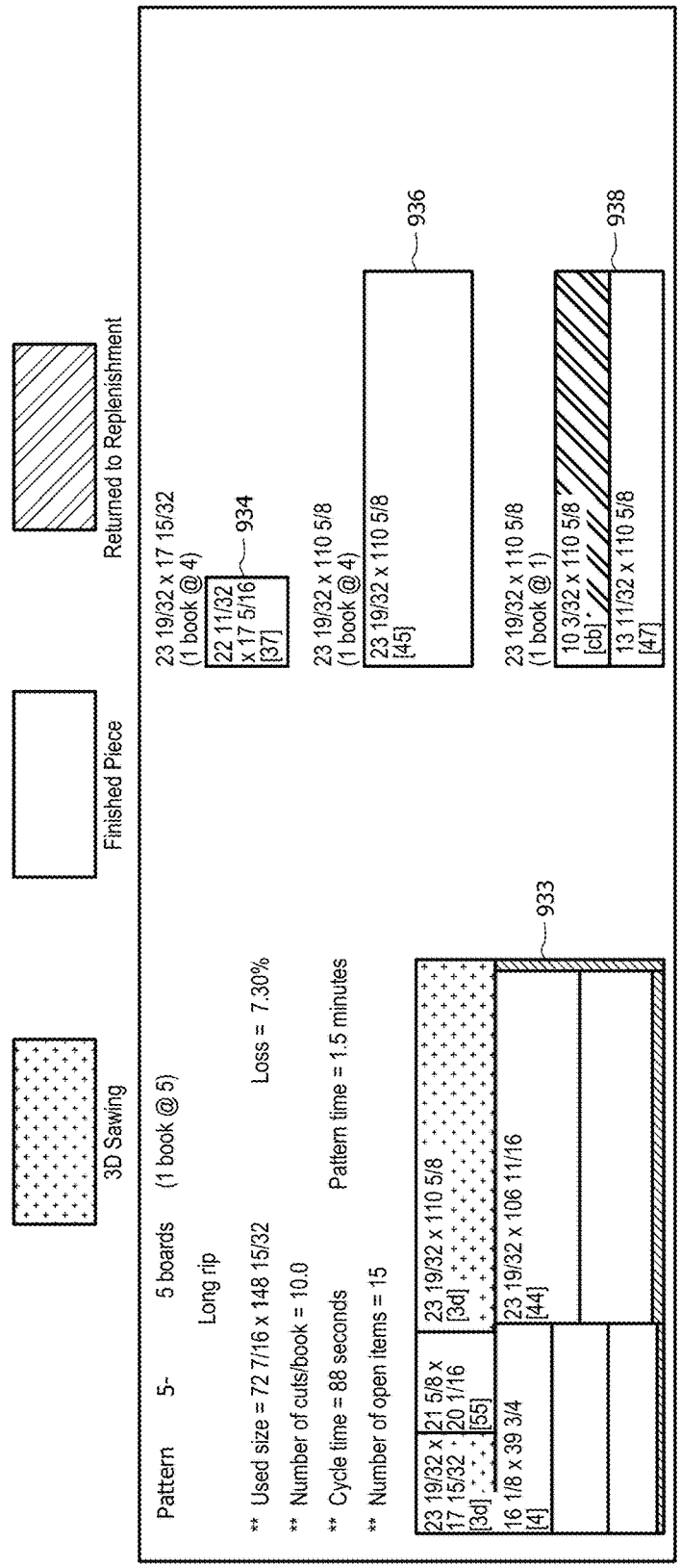
FIG. 9E depicts patterned saw book arrangement corresponding to a batch job order according to an embodiment of the present invention.
Figure 9F:
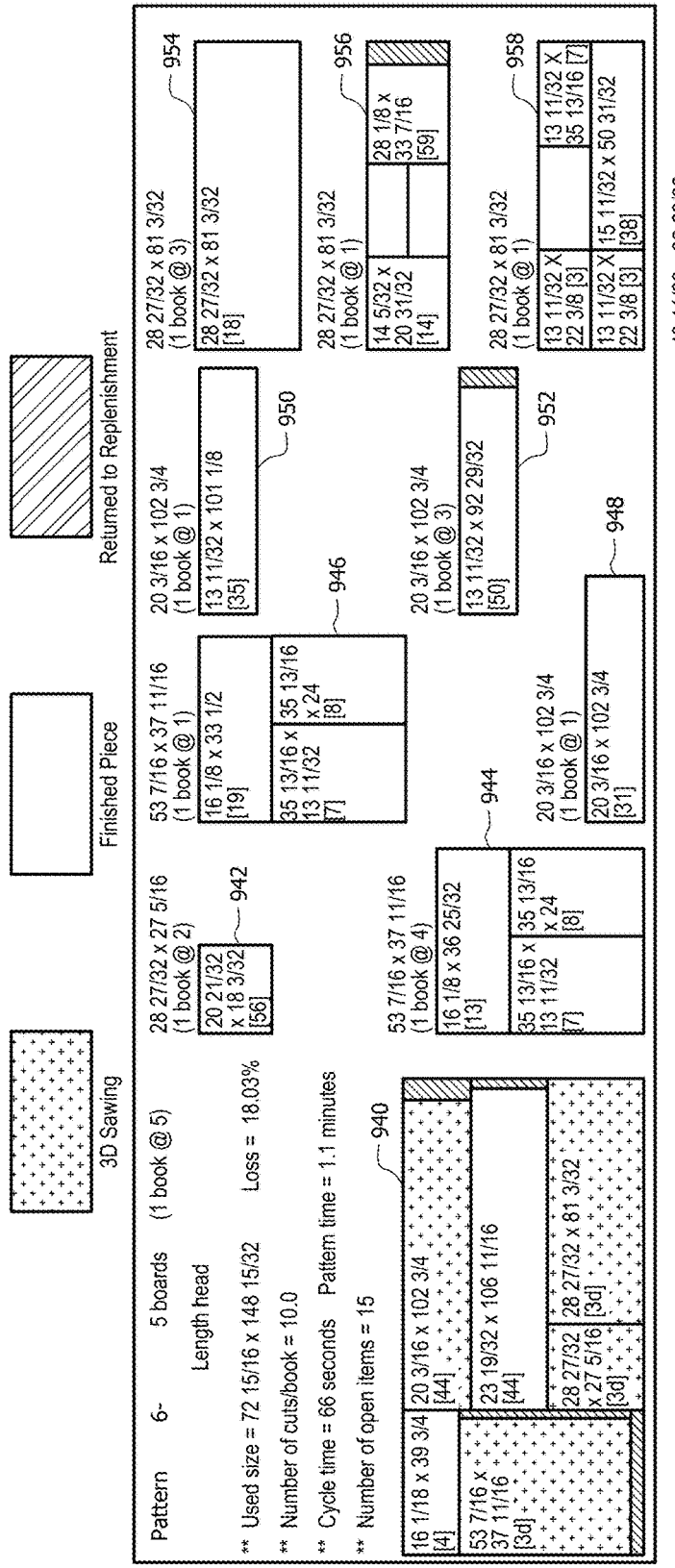
FIG. 9F depicts patterned saw book arrangement corresponding to a batch job order according to an embodiment of the present invention.
Figure 9G:
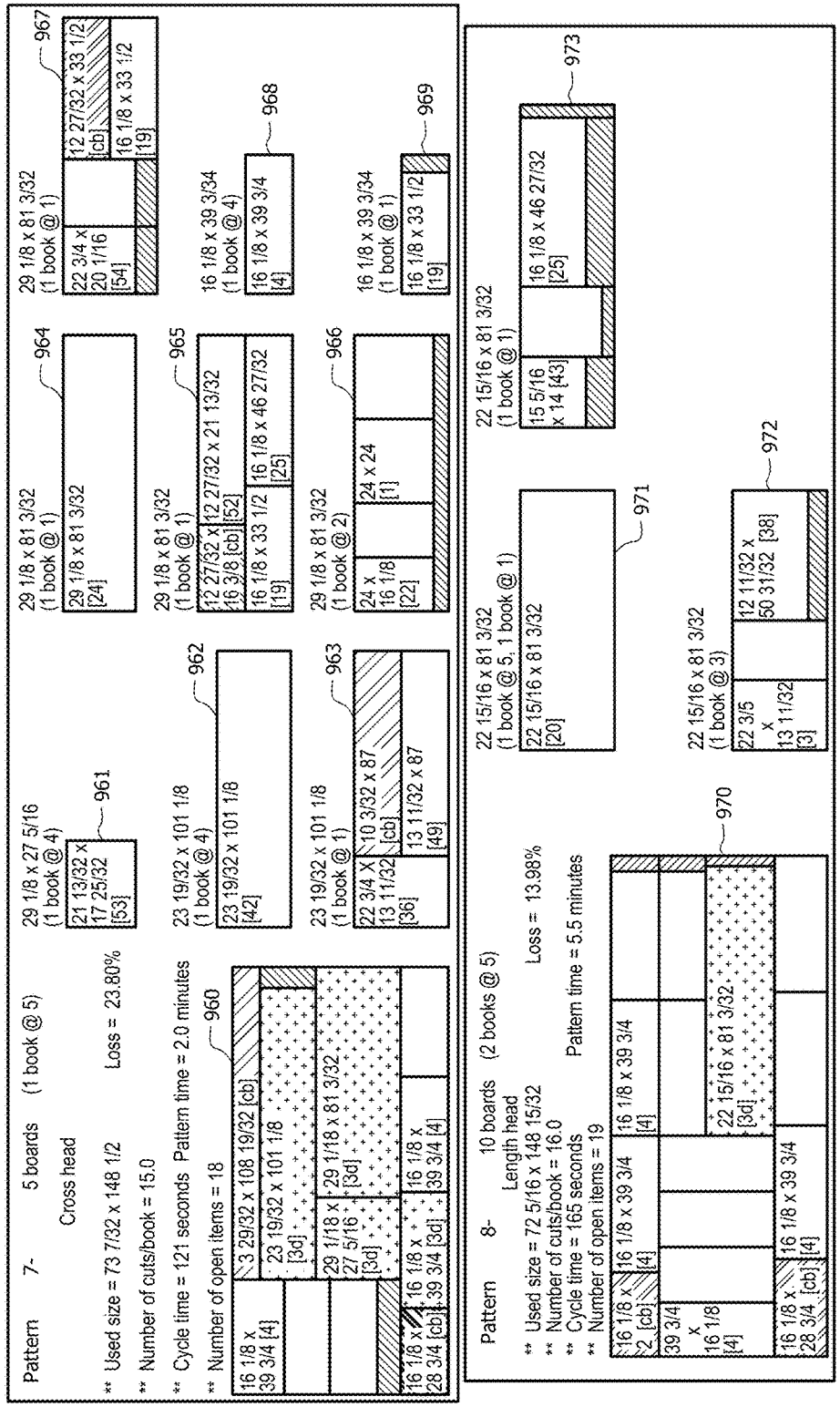
FIG. 9G depicts patterned saw book arrangement corresponding to a batch job order according to an embodiment of the present invention.
Figure 9H:
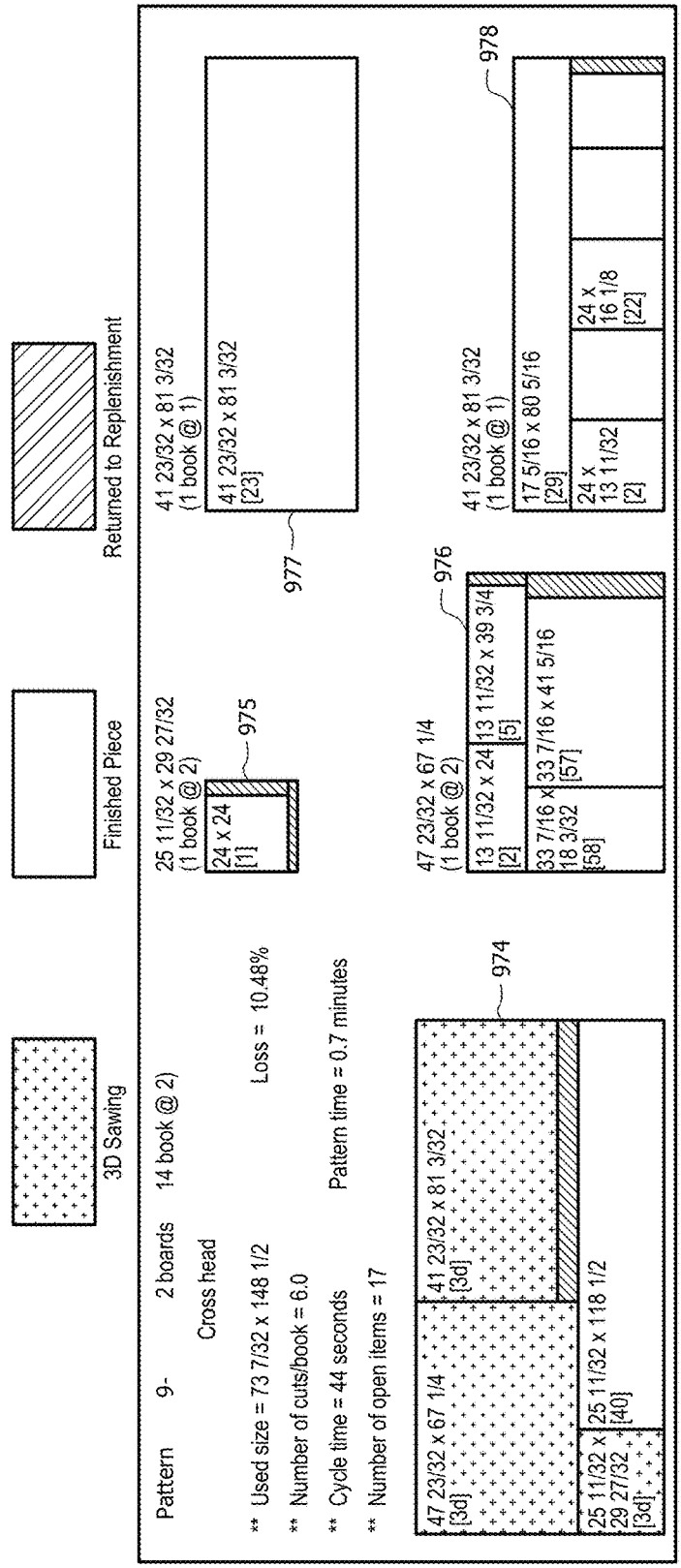
FIG. 9H depicts patterned saw book arrangement corresponding to a batch job order according to an embodiment of the present invention.
Figure 9I:
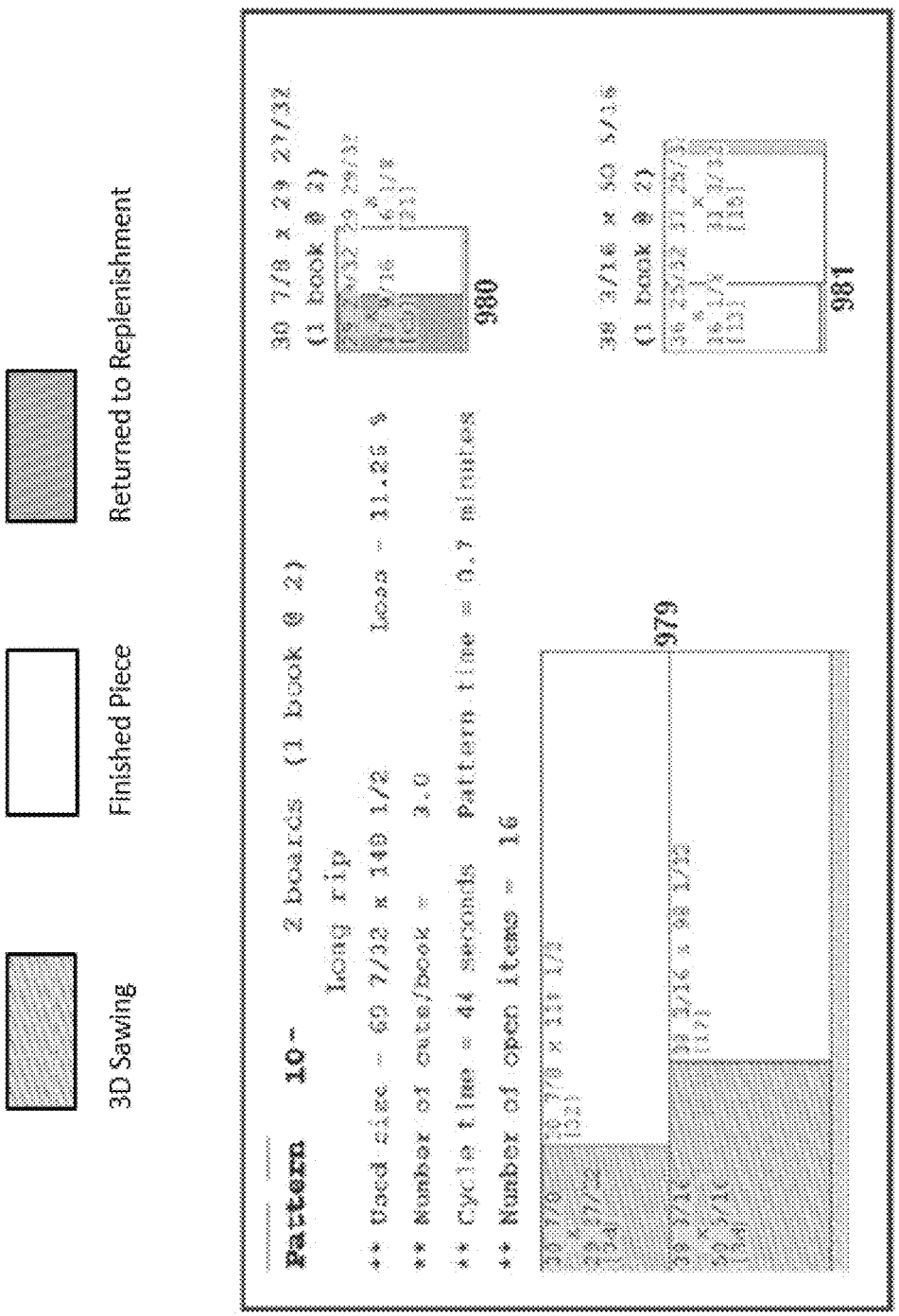
FIG. 9I depicts patterned saw book arrangement corresponding to a batch job order according to an embodiment of the present invention.
Figure 9J:
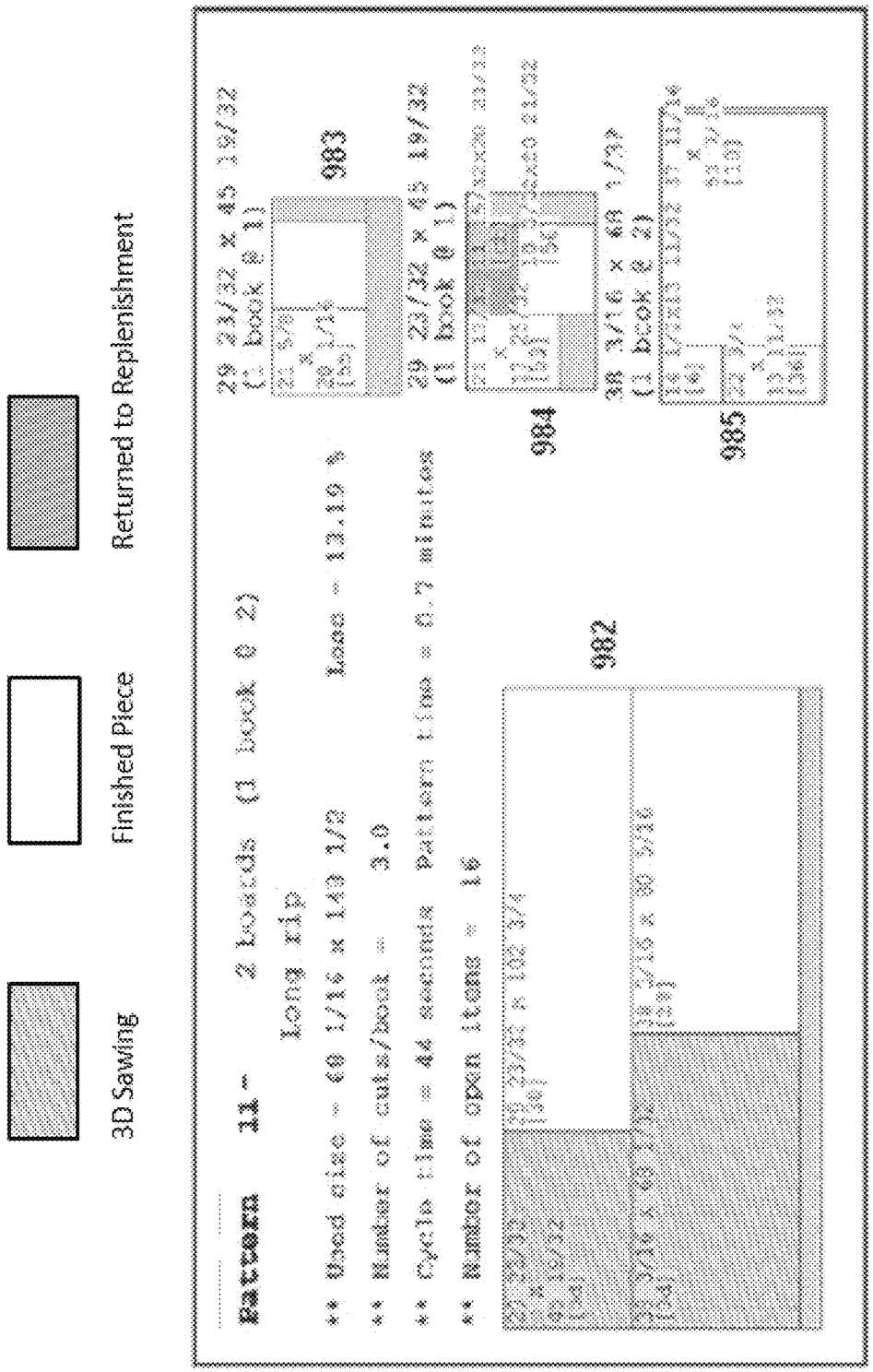
FIG. 9J depicts patterned saw book arrangement corresponding to a batch job order according to an embodiment of the present invention.
Figure 9K:
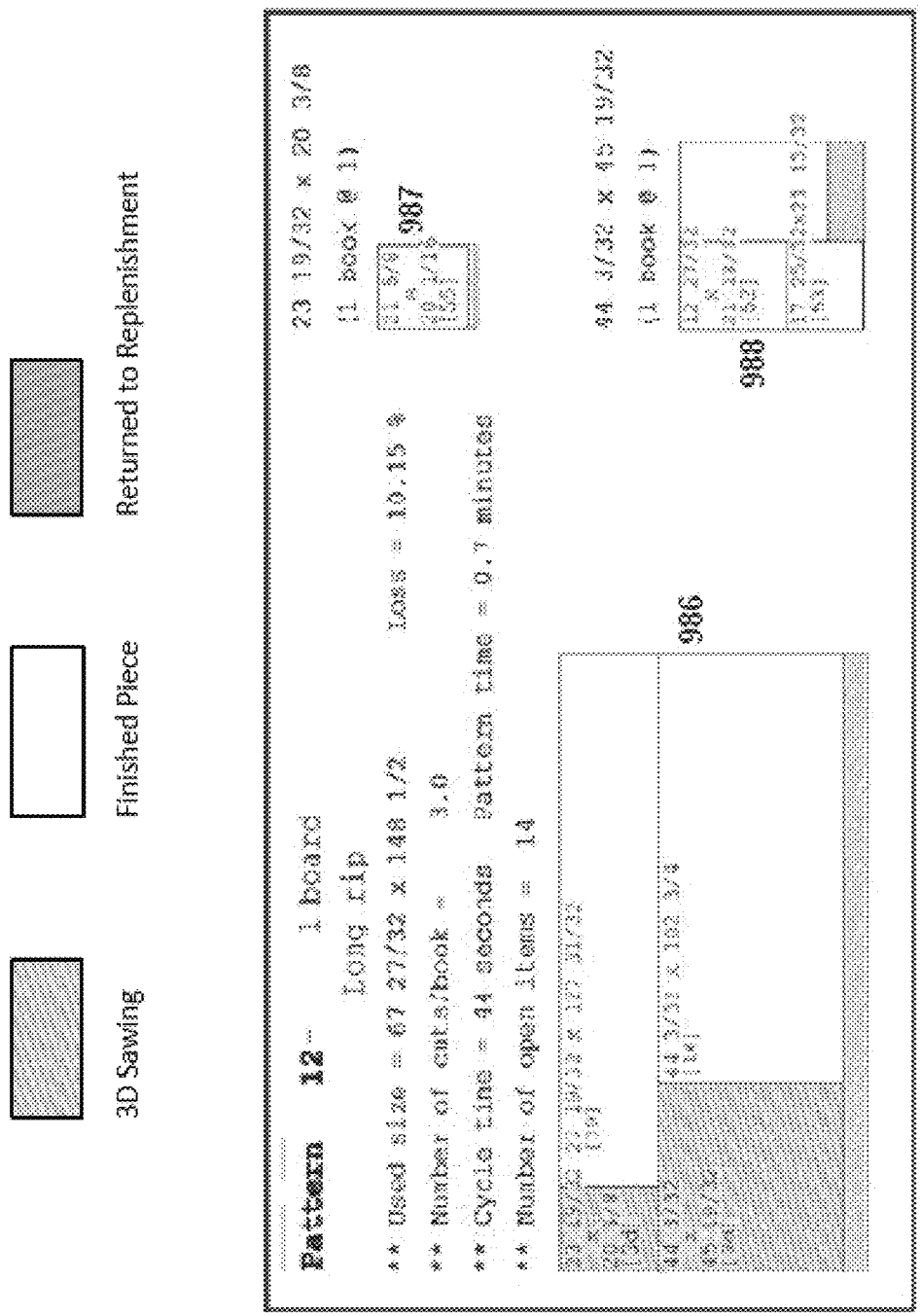
FIG. 9K depicts patterned saw book arrangement corresponding to a batch job order according to an embodiment of the present invention.
Figure 9M:
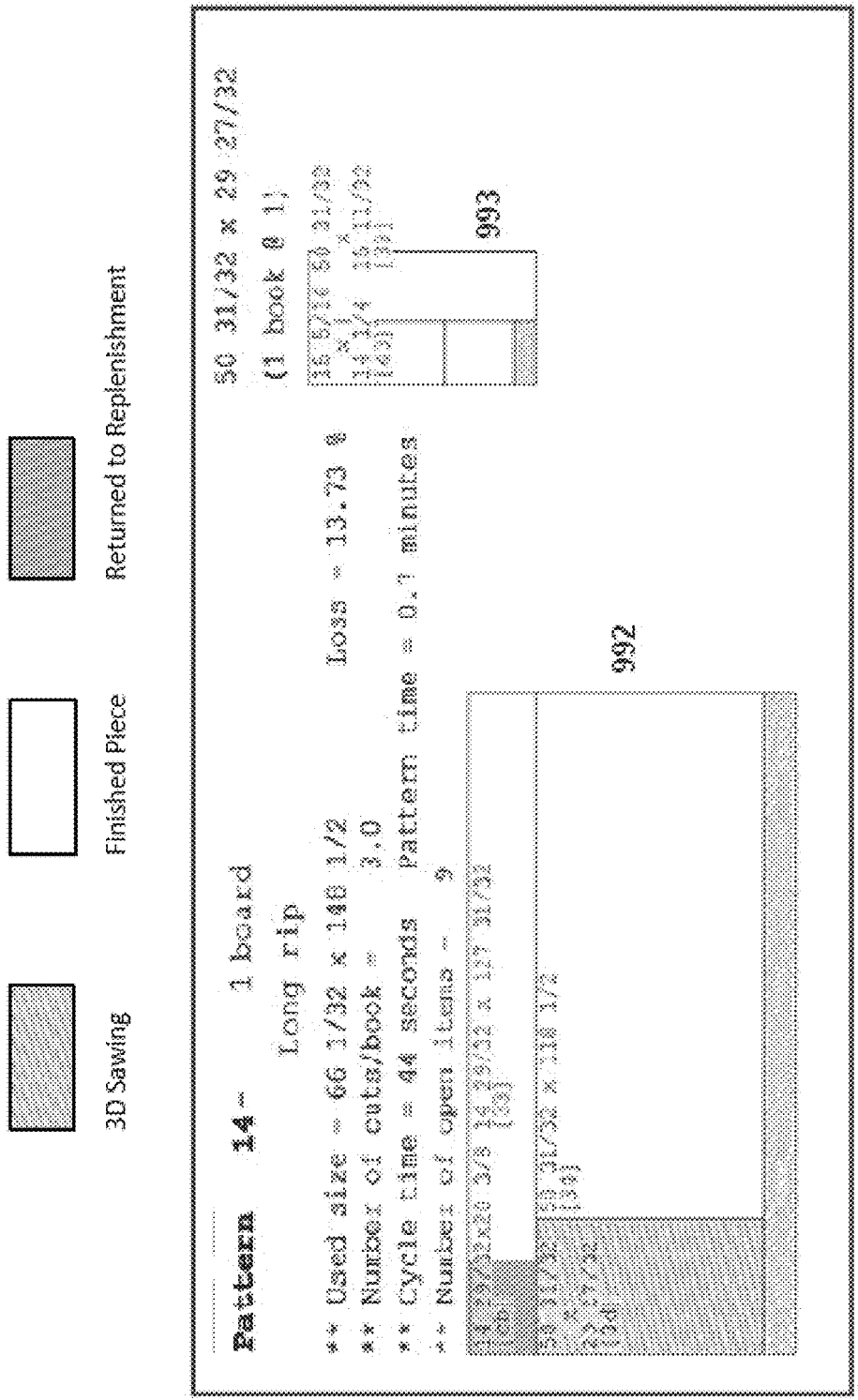
FIG. 9M depicts patterned saw book arrangement corresponding to a batch job order according to an embodiment of the present invention.
Figure 9N:
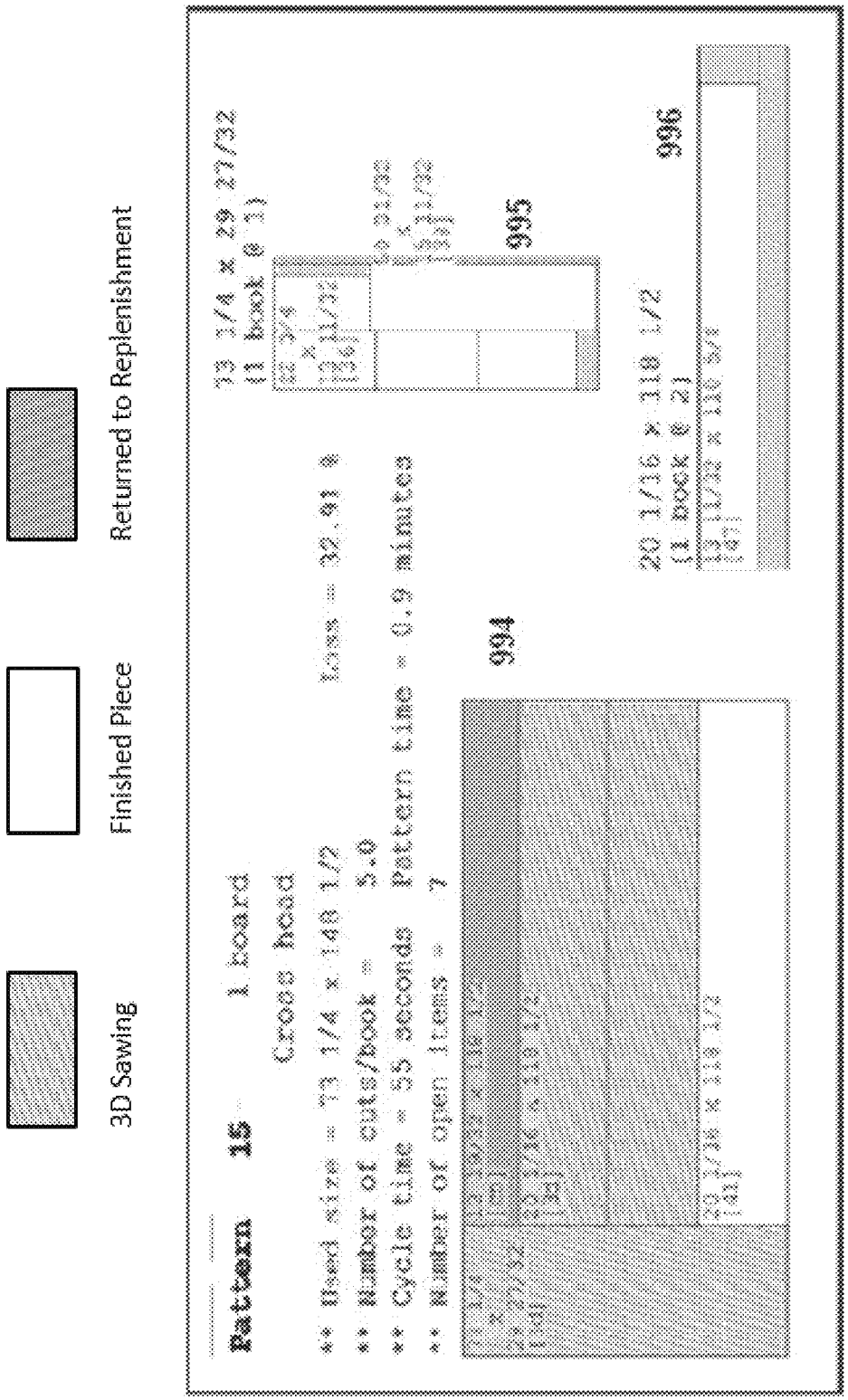
FIG. 9N depicts patterned saw book arrangement corresponding to a batch job order according to an embodiment of the present invention.

Pattern 3 of the manufacturing batch is depicted in FIG. 9C. This pattern differs in various respects from the first two patterns. This pattern 906 employs a long rip cut and comprises twenty boards arranged in four books of five sheets or panels each. As shown in the legend, part of the books will be cut initially as finished pieces, part of the book will be cut for replenishment material and part of the book will undergo three dimensional sawing. On the right side of FIG. 9C the various cuts 908, 910, 912, 914, 916, 918 that will occur according to Pattern 3 906 and the four books of five sheets (twenty boards total) are described. As shown, four of resulting panels sawn according to Pattern 3 906 are finished pieces, two of the resulting panels are partially allocated as replenishment material. Also, area 907 of Pattern 3 906 designated for three dimensional sawing resulted in one book of one panel of 23¹⁹⁄₃₂ in.×106¹¹⁄₁₆ in. and two books of five and one book of four of 22¾ in.×20¹⁄₁₆ in. panels. In other words, the of 23¹⁹⁄₃₂ in.×106¹¹⁄₁₆ in. footprint of panel three was subject to different cuts or multiple patterns beneath that footprint, resulting in different cuts along the x- and y-axis of the raw panel at different depths (i.e. sheets). In this manner, the long rip cuts associated with Pattern 3 in FIG. 9C result in the most efficient use of the twenty-board book to fulfil the requirements of the manufacturing batch. This is derived from CPM software that considers various factors according to data stored in the unified data center.

In the example manufacturing batch, seventeen patterns are used and the designated sawing arrangement for the remaining fourteen patterns are depicted in FIGS. 9D through 9P. As seen in these figures, sawing according to the six-pack of sawing patterns is employed in multiple pattern arrangements for those Patterns that include a three dimensional footprint or region. In those three dimensional regions, different sheets employing the same sawing type but requiring cuts of different dimensions are defined to fulfill the manufacturing batch's requirements. As this table shows, four of the seventeen patterns utilized require no three-dimensional sawing (of the type described in connection with FIGS. 1B-1D). Some require only some three dimensional sawing and some require almost all three dimensional sawing. The sequence of pattern utilization is a factor in determining which alternative production plan is selected. If there is a sequence in which, for example, excessing idle time of the three dimensional saw becomes a limiting factor for the entire production plan, then the process control algorithm of the CPM will re-sequence the patterns to arrive at another production plan.

Figure 9P:
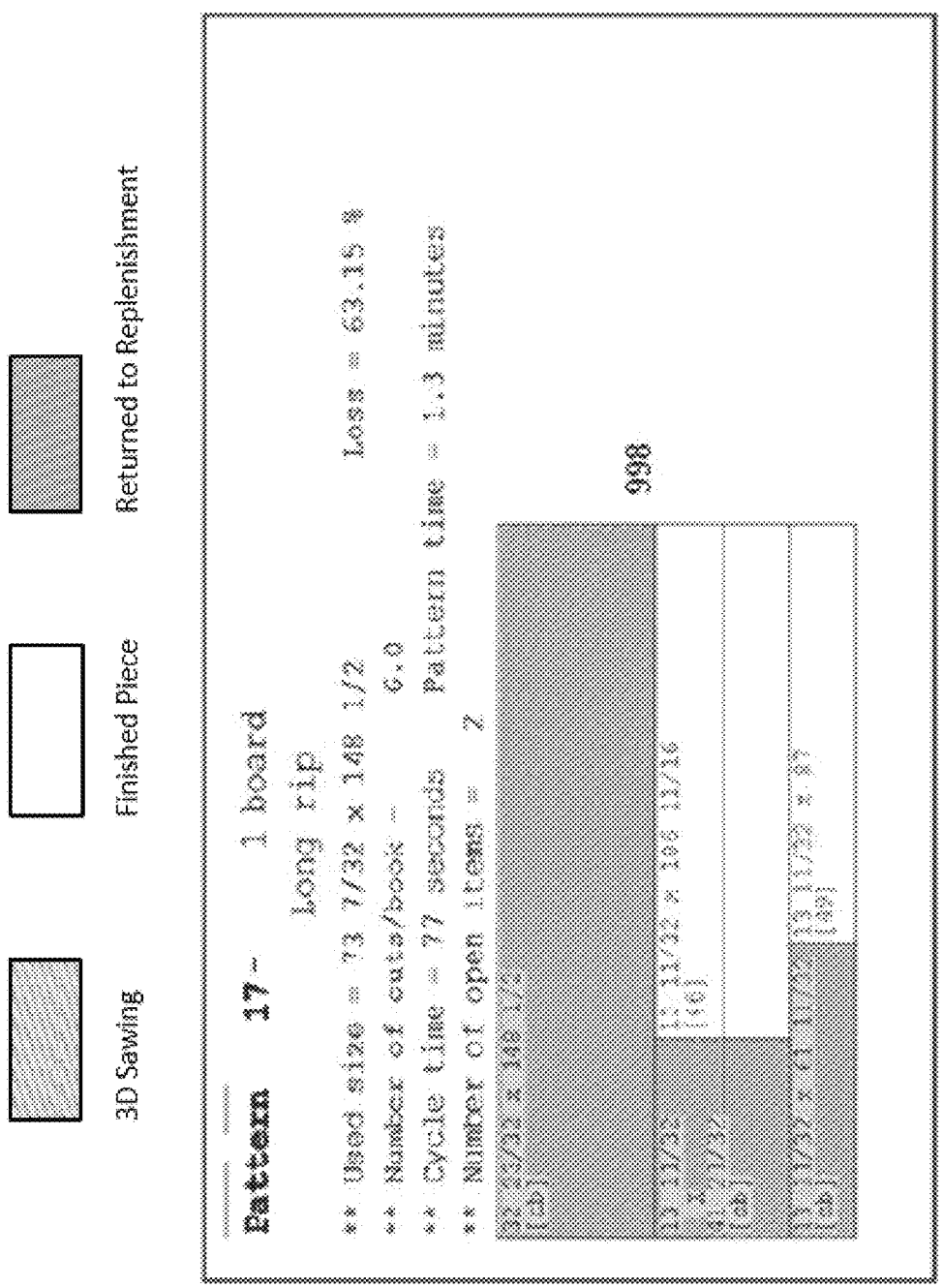
FIG. 9P depicts patterned saw book arrangement corresponding to a batch job order according to an embodiment of the present invention.
Figure 12B:
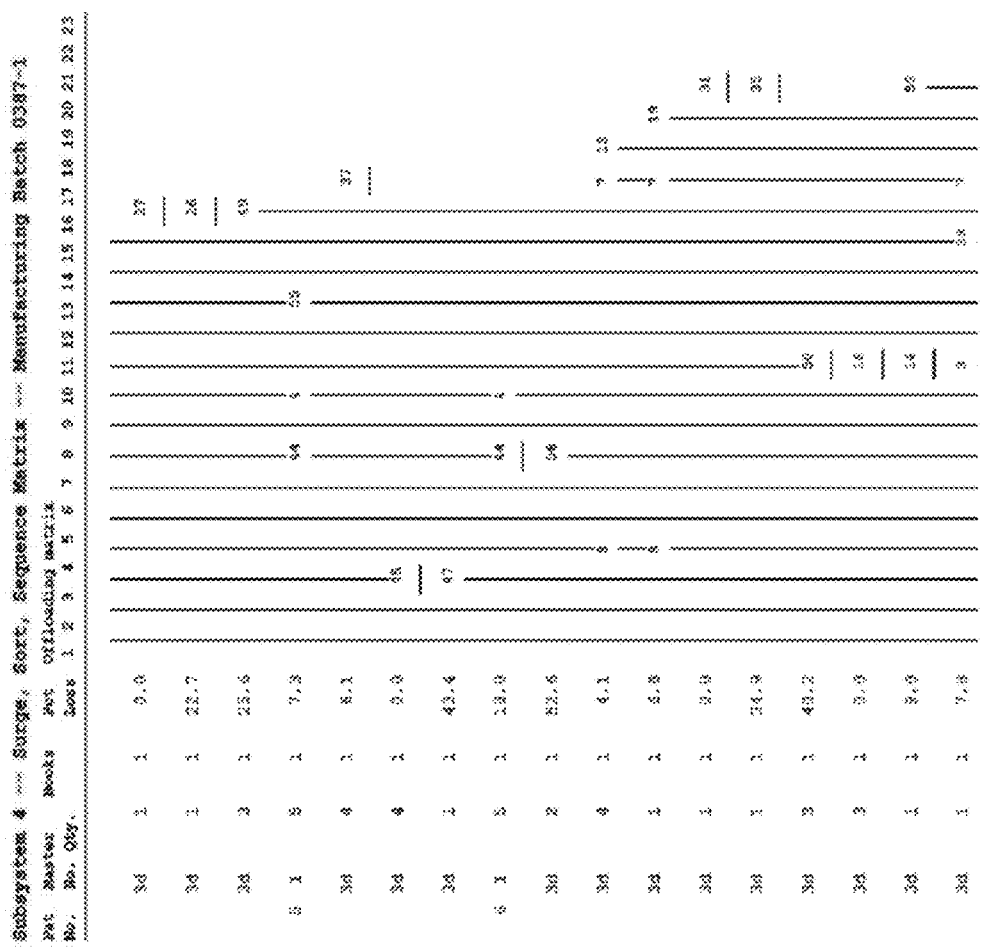
FIG. 12B is a presentation of product piece offloading data pertaining to a batch job order according to an embodiment of the present invention.
Figure 12C:
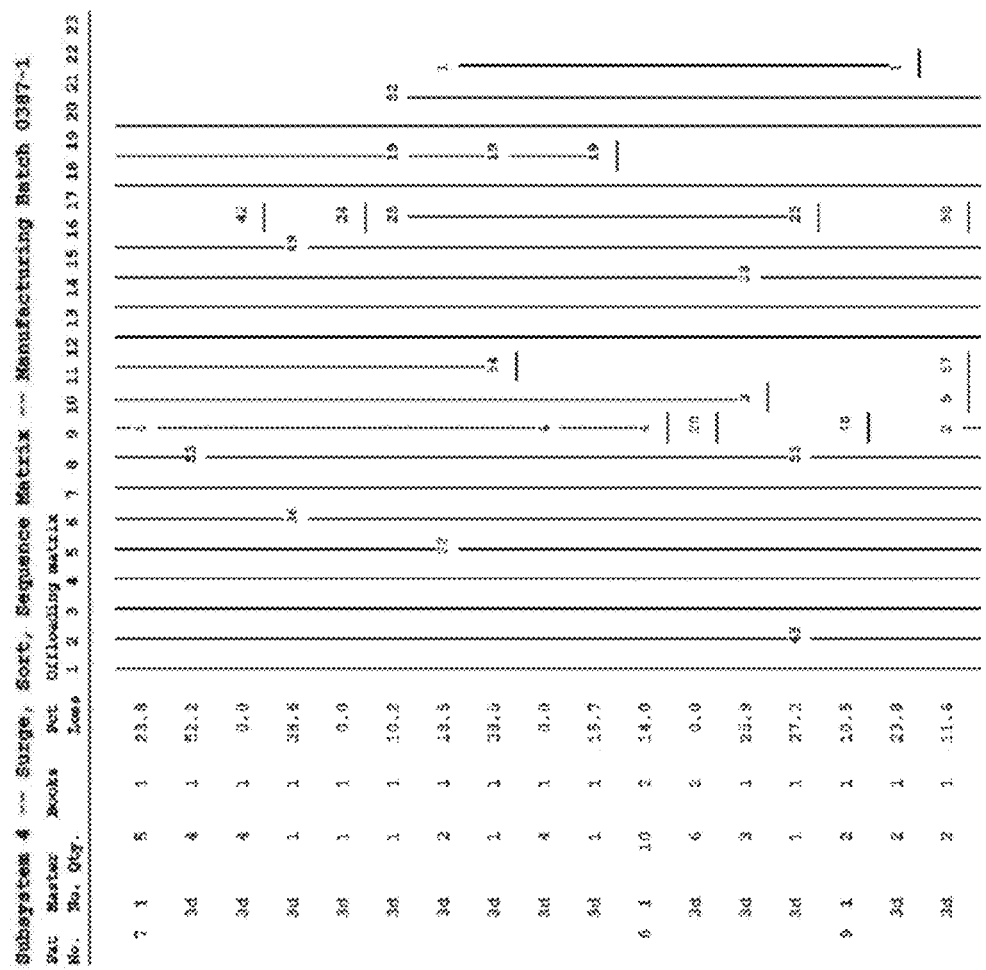
FIG. 12C is a presentation of product piece offloading data pertaining to a batch job order according to an embodiment of the present invention.

FIG. 10 depicts a table corresponding to the same manufacturing batch described on a per-pattern basis in FIGS. 9A through 9P. The table in FIG. 10 provides a summary of the relevant saw patterns that were included in books having a three-dimensional stack. The table in FIG. 10 also provides the dimensions of three dimensional stack associated with the saw pattern and the number of boards, if any, that were designated at replenishment materials. Note that Patterns 1 and 2 of FIGS. 9A and 9B do not appear on the table of FIG. 10 because those patterns did not employ a three dimensional stack. The table of FIG. 10 in its entirety is an aggregation of dimensions of panels cut from boards that underwent three dimensional stacking. That is, stacks that employed books of at least one sheet, with each book employing a different cutting arrangement within the three dimensional stack. From the table of FIG. 10, it can be gleaned how many boards of a particular dimension were cut from three dimensional stacks and that correspond to each pattern.

FIGS. 11A-11C provide another table in which the same manufacturing job batch discussed above is presented. In the presentation of FIGS. 11A-11C, the quantities of the various furniture panel sizes required to be sawn to fulfil the manufacturing job batch ins provided. The table also provides the pattern (from one to seventeen as discussed above) used to saw the sized panels. Note that in FIG. 11A, 239 panels measuring 16⅛ in.×39¾ in. were sawn, and these panels were sawn using patterns 3 4, 5, 6, 7, 7 (3D) and 8. The CPM system determined that according to data stored in the unified data center at the time of batch job fulfillment these patterns were the optimal patterns to employ to obtain 239 panels of that dimension. The CPM system's software determined at the relevant point in time that the selected sawing paradigm resulted in minimal waste, used little time and was otherwise an efficient or clear path to completion. While this was the most efficient manner of cutting the large quantity of boards of that particular dimension, virtually an endless combination of cuts employing the six-pack of sawing patterns could have been selected, with different scenarios resulting in the optimal scenario depending on the circumstances manifested by the data at that moment in time.

FIGS. 12A-12E provide another presentation of data in table form corresponding to the manufacturing batch job example provided above. In the table that starts in FIG. 12A and continues serially through FIG. 12E, data corresponding to the quantity of boards sawn according to the various patterns, the number of books pertaining to that pattern and the percentage of loss associated with the pattern. Additionally, the table provides Offloading Matrix data pertinent to SSSS 325. Recall the discussion above regarding SSSS 325 in connection with FIG. 7. In the SSSS 325 various finished part locations 702. These locations are identified in the various columns under the heading "Offloading matrix" in FIGS. 12A-12E. Each column under the heading "Offloading matrix" identifies a finished part location at which the sawn boards according to the identified patterns are to be offloaded. The matrix of FIGS. 12A-12E, like the saw patterns and three dimension cutting, is premised on optimization decisions made by the CPM in view of data stored in the unified data center that provides a real time snapshot of conditions of the factory. Based on this information, an offloading or finished part location is selected for the various completed pieces. As shown in Table 1, four of the seventeen patterns utilized require no three-dimensional sawing (of the type described in connection with FIG. 1E). Some require only some three dimensional sawing and some require almost all three dimensional sawing. The sequence of pattern utilization is a factor in determining which alternative production plan is selected. If there is a sequence in which, for example, excessive idle time of the three dimensional saw becomes a limiting factor for the entire production plan, then the process control algorithm of the CPM will re-sequence the patterns to arrive at another production plan.

As discussed above in connection with FIGS. 10, 11A-C and 12A-E, the CPM also provides master information such as Raw Material Storage and SSS subsystem offloading instructions for the particular manufacturing job batch. As discussed above, the surge, sort and sequence matrix provides an offloading matrix for the various pieces manufactured according to a job batch order, which indicates the subsystem location from which the parts to fulfil a particular batch order are obtained, and the order in which they are obtained to fulfil the batch order in the most optimal manner.

It is contemplated that legacy factories can be invited to become members of the CPM data driven On-Demand Production paradigm. Upon joining, NPP software installation as well as sensors associated on subsystem equipment to monitor and collect data occurs at the legacy factory, making the joining factory another data supply chain, providing additional data to the optimization process. CPM's PSSM supply chain data is associated with the data requirements of the other subsystems, end of line solutions, material replenishment and material storage facilities. In this manner, CPM operates as a manufacturing simulator.

In one embodiment, the consumer can via a computer (which includes a desktop computer or any portable or handheld device such as a smart phone or tablet with appropriate application programs allowing user interaction with the on-demand order platform) enter orders or queries through the communication network, such as the Internet. In one scenario, when the consumer enters an order, the order is then communicated along a communication link to the communication network. The network then communicates with a Unified Data Center. CPM then utilizes specific algorithms against incoming customer orders and identifies which of the participating manufacturers can fill the specific order based on the customer's parameters The manufacturer identified as the best positioned to fulfill an order can either accept or decline an order. If a manufacturer declines an order, then the order will be resubmitted through the exchange process as an opportunity for other manufacturers fulfill. This process continues until a manufacturer accepts the fulfillment opportunity. Once a manufacturer accepts the order, the payment process is initiated. The UDC also authenticates and settles the order and financial transaction.

Figure 14:
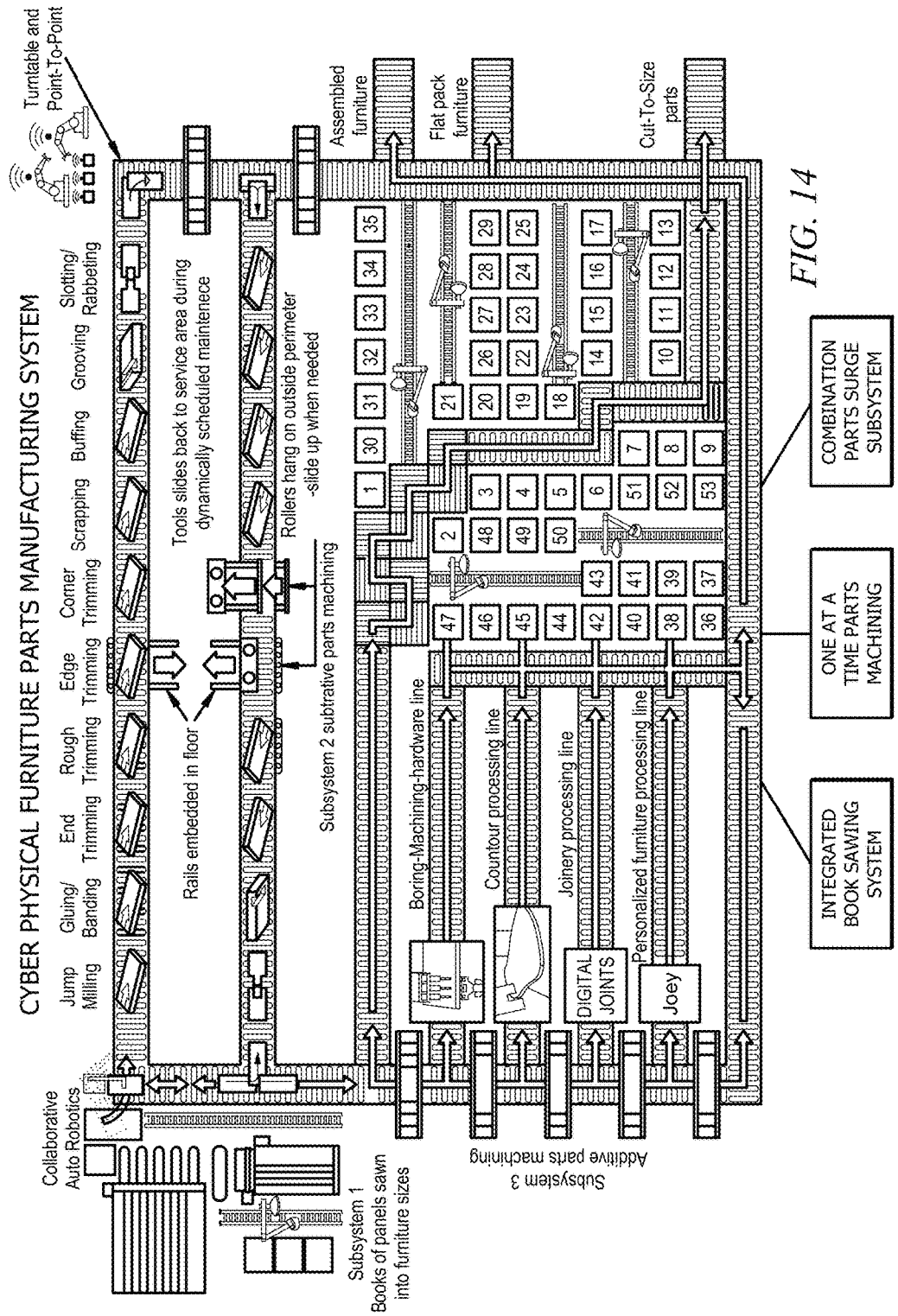
FIG. 14 depicts the subsystems of the on-demand furniture manufacturing facility according to the embodiments of the invention.

FIG. 14 is an alternative depiction of the four CPM subsystems described above in connection with FIGS. 3-7. FIG. 14 depicts an embodiment of a cyber physical system capability of converting analog inputs into binary code such that the manufacturing computers fed by data input from sensors can communicate to one another and then (when necessary) revert the messaging back to analog for human interpretation. The furniture parts manufacturing system is composed of five subsystems. The first subsystem is an integrated book sawing subsystem to cut parts to size in the way proven and recognized over a 50-year history of use as the most efficient method. Book sawing refers to the operation of cutting a stack of panels with the same accuracy as cutting single individual panels. The second subsystem consists of a one at a time subtractive parts machining, which is recognized to be up to 60% faster compared to batch machining and requires no labor compared to traditional batch method of machining parts which was accomplished through human labor efforts. The third subsystem consists of one at a time parts machining additive to the subtractive parts machining. The fourth subsystem is a combination of parts surge subsystem that sorts and sequences the parts in the order of palletizing or flat pack out or furniture assembly. (Subsystem 1: Cut-To-Size Book Sawing Subsystem 2: Subtractive Machining Subsystem 3: Additive Machining Subsystem 4: Surge—Sort—Sequence). The final system is the sensor subsystem that detects changes in environmental factors. The sensors keep CPM aware of local factory conditions and other relevant network conditions. The sensors are associated with the various saws and machinery to sense their respective operating conditions, which are also fed back to CPM.

The five subsystems enable lean, time-volume predictable activities to take root throughout the factory. During the initial start-up phase the event driven system controls are paced by the subtractive machining subsystem. The sawing, additive machining and surge-sort-sequencing subsystems adjust to the pace of subtractive machining. Operational data is then produced allowing the event driven controls (human interfaced decisions) to enable the development of the combinational controls (automated digital decisions) and the maximum efficiency inherent in the five subsystems 4.0 Cyber Physical System. The combination control contributes to the on-demand production by maximizing productivity, scalability, flexibility and minimizing floor space, eliminating work-in-process inventory, enabling total factory lean and time cost predictable activities, building quality via precise work-piece (part) control.

In one embodiment of a virtual network of the on-demand furniture manufacturing platform. As order opportunities are entered into the network by the customer, the network systems examine backlogs and tooling capabilities and determine the optimal manufacturer among the network of on-demand producers to fulfill the order. This is based on real-time analysis of data concerning multiple parameters associated with the manufacturers. The content of the furniture order is also a variable, including any price limitations, delivery timing demands and the like. Predictive optimization algorithms are at the heart of the present system for determining which of the factories have a clear path for producing on demand furniture based on customer requirements. Those eligible factories are then notified. A factory interested in fulfilling the order can send a message through the platform indicating that the chosen manufacturer wishes to pursue the opportunity. The finally-selected factory by the user can send a transmission to indicate that it will fulfill the furniture product order.

Once an order is placed by a customer the order specification is transferred to the factory's cloud-based work place to be optimized. A time delay of a few minutes (10 minutes or less) takes place where the customer is not yet engaged. The Unified Data Center authenticates and settles transactions and is the organizing and orchestrating force connecting factories on-demand furniture manufacturing industry. Note that a customer may select a particular manufacturer to fulfill an order regardless of whether another manufacturer participating in the network may be designated as the ideal or optimal manufacturer for a given order through quantitative or non-quantitative comparisons.

To be compatible, factories become connected by adopting the Cleared Path Manufacturing (CPM) method of doing business. This includes a process in which the customer is given the right to select the manufacturer regardless of the quantitative or non-quantitative comparisons.

In another embodiment, the selection is made by a rule based agreement in which selection of manufacturers is based on the customer input. Consideration is based on maximum delivery time, fastest delivery time, lowest price and other factors. Upon the customer receiving the screen to select his or her inputs, once the customer submits the input data, the customer has become engaged. The NPP establishes a unique foundation for instant communication with hyper-connected customers that assigns a manufacturer for fulfillment of a particular order according to the resources available to each participating manufacturer as well as the customer's defined parameters. The resources available to the manufacturer that are taken into account include the materials available to a particular manufacturer. In addition, the manufacturer's internal capabilities, including the availability of individual machinery within a manufacturer's facility that will be necessary to manufacture a particular item is a determining factor.

The process of selecting a manufacturer among numerous potential manufacturers to fulfil an order is premised upon many variables. Predictive modeling based on historical data is used to determine the optimal path for manufacturing each component of a requested furniture item. Among a seemingly infinite number of possibilities in terms of determining which manufacture is the optimal manufacturer for completing the most suitable manufacturers for completing the order will be identified. At the manufacturer level, once the manufacturer is selected, the programmable saws and other manufacturing machinery production begins according to specific pattern code files that correspond to the particular furniture item ordered. That is, code files that control operation of saws and other machinery within the manufacturer's facility cause cutting pattern styles, such as those shown in FIG. 1(B), to be invoked. This results in cuts and other machining operations according to the particular specifications of an ordered item. The presently described system bridges intra-manufacturing facility automation with inter-facility resource optimization. This combination allows allocation of furniture orders, down to the component or part level, to be manufactured by those facilities having the capacity to fulfil the order based on historical data and current machine status as determined through the previously defined sensor subsystem. This combinatorial controlled system provides additional advantages beyond real time on-demand production. These advantages include maximizing facility productivity, minimizing facility floor space, maximizing facility scalability and flexibility, automating material replenishment, eliminating work-in-process inventory and improving safety through reduction or elimination of labor intensive batch processing.

Figure 13:
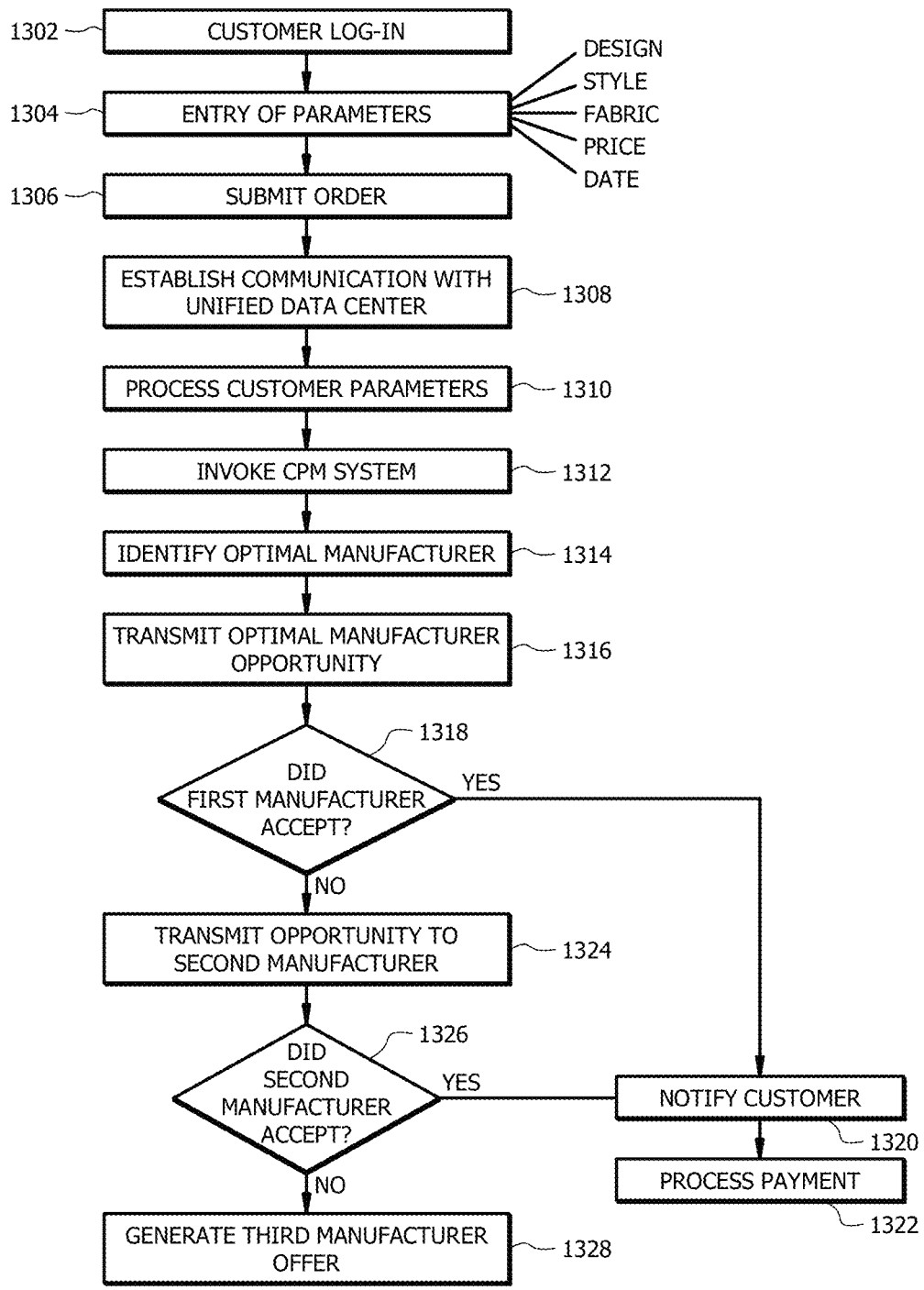
FIG. 13 is a flow diagram of a method for on-demand furniture ordering according to an embodiment of the present invention.

FIG. 13 depicts a flow diagram of an operation between a customer and the NPP to place and process an on-demand furniture order. The process starts at step 1302 with a customer desiring to place an order for purchase of a made to order piece of furniture logging into a web-based interface to the UDC. The login page can be presented to the user via a computer, tablet, smart phone or other processing device via a dedicated webpage or user interface through which the user may enter and transmit data. Through the webpage, the customer may place an order for a made to order furniture piece. With the order the customer can enter parameters at step 1304 relating to the design, style, fabric, price and date of the made to order furniture piece. Once the customer selects the appropriate key or command on the webpage, the customer's order is submitted at step 1306. With this submission, at step 1308 a communication path is established over a wide area network such as the Internet with the UDC. Specifically, the customer's selected parameters are transmitted to the Unified Data Center (UDC) and the UDC processes the customer parameters at step 1310. As part of the process, the Cleared Path Manufacturing (CPM) system, discussed above in connection with the UDC, is invoked at step 1312. Based on the parameters sent by the customer, the CPM identifies at step 1314 and optimum manufacturing facility to which the fulfillment opportunity will be presented. This manufacturing facility is one of several such facilities that are part of the NPP network.

Once the fulfillment opportunity is transmitted to the identified manufacturer at step 1316, that manufacturer has the choice of accepting or declining the opportunity at decision point 1318. If this first manufacturer accepts the fulfillment opportunity, the method proceeds to step 1320 and the customer is notified and the process of the customer submitting payment for the order is invoked at step 1322. If, on the other hand, the first manufacturer declines the opportunity, the CPM transmits the opportunity to a second participating manufacturer at step 1324. This second manufacture is deemed, through the parameter information, as the second-best option to fill the order. If the second manufacturer accepts the offer at decision point 1326, then the process reverts back to step 1320 and customer is so notified and the payment process is invoked. If, on the other hand, the second manufacturer declines, then the CPM at step 1328 identifies the next best manufacturer to fill the order based on the parameters. This process continues until a manufacturer accepts the fulfillment opportunity.

The foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

ADDITIONAL DISCLOSURE

Clause 1. A furniture manufacturing system, comprising:
a furniture material panel sawing module comprising:
at least one processor in communication with a data storage facility configured to store a furniture manufacturing facility operational capabilities, the processor configured to perform steps comprising:
receiving a plurality of furniture purchase orders;
compiling a job batch comprising a plurality of furniture parts associated with the plurality of furniture purchase orders;
retrieving from the data storage facility a set of dimensions corresponding to the plurality of furniture parts of the compiled job batch;
determining, based on the set of dimensions and the furniture manufacturing facility operational capabilities, a path for manufacturing the plurality of furniture parts;
selecting, from a collection of sawing patterns, a first sawing pattern for manufacturing the plurality of furniture parts and a second sawing pattern for manufacturing the plurality of furniture parts;
identifying an arrangement of the first sawing pattern corresponding to the set of dimensions and a size of a panel; and
identifying an arrangement of the second sawing pattern corresponding to the set of dimensions and the size of the panel,
a saw module for receiving computer readable instructions of the identified arrangement of the first sawing pattern and of the identified arrangement of the second sawing pattern; and
a saw under control of the saw module, wherein the saw is configured to cut a plurality of stacked panels according to the arrangement of the first sawing pattern and the arrangement of the second sawing pattern.

Clause 2. The system of any preceding or proceeding clause, wherein the path comprises applying an enhancement of the cut plurality of stacked panels.

Clause 3. The system of any preceding or proceeding clause, wherein the path further comprises identifying a location for placement of the cut plurality of stacked panels following the enhancement.

Clause 4. The system of any preceding or proceeding clause, wherein the arrangement of the first sawing pattern comprises employing a specified sawing type to cut the plurality of stacked panels.

Clause 5. The system of any preceding or proceeding clause, wherein the arrangement of the second sawing pattern comprises employing a specified sawing type to cut the plurality of stacked panel.

Clause 6. The system of any preceding or proceeding clause, wherein the arrangement of the first sawing pattern further comprises a single pattern saw book.

Clause 7. The system of any preceding or proceeding clause, wherein the arrangement of the first sawing pattern further comprises a multiple pattern saw book.

Clause 8. The system of any preceding or proceeding clause, wherein the arrangement of the second sawing pattern further comprises a single pattern saw book.

Clause 9. The system of any preceding or proceeding clause, wherein the arrangement of the second sawing pattern further comprises a multiple pattern saw book.

Clause 10. The system of any preceding or proceeding clause, wherein the enhancement is performed by a subtractive machinery.

Clause 11. The system of any preceding or proceeding clause, wherein the enhancement is performed by an additive machinery.

Clause 12. The system of any preceding or proceeding clause, wherein the saw module causes the saw to cut some of the stacked panels according to the first sawing pattern and to cut some of the stacked panels according to the second sawing pattern.

Clause 13. The system of any preceding or proceeding clause, wherein the saw module causes the saw to cut less than all of the stacked panels according to the first sawing pattern and to cut less than all of the stacked panels according to the second sawing pattern.

Clause 14. The system of any preceding or proceeding clause, wherein the multiple pattern saw book comprises designating the first sawing pattern to a number of stacked panel.

Clause 15. The system of any preceding or proceeding clause, wherein operations of the furniture manufacturing facility are performed at a single geographical location.

Clause 16. The system of any preceding clause, wherein operations of the furniture manufacturing facility are performed at a plurality of geographical locations.

I claim:

1. A furniture manufacturing system, comprising:
a furniture material panel sawing module comprising:
at least one processor in communication with a data storage facility configured to store a furniture manufacturing facility operational capabilities, the processor configured to perform steps comprising:
receiving a plurality of furniture purchase orders;
compiling a job batch comprising a plurality of furniture parts associated with the plurality of furniture purchase orders;
retrieving from the data storage facility a set of dimensions corresponding to the plurality of furniture parts of the compiled job batch;
determining, based on the set of dimensions and the furniture manufacturing facility operational capabilities, a path for manufacturing the plurality of furniture parts;
selecting, from a collection of sawing patterns, a first sawing pattern for manufacturing the plurality of furniture parts and a second sawing pattern for manufacturing the plurality of furniture parts;
identifying an arrangement of the first sawing pattern corresponding to the set of dimensions and a size of a panel; and
identifying an arrangement of the second sawing pattern corresponding to the set of dimensions and the size of the panel,
a saw module for receiving computer readable instructions of the identified arrangement of the first sawing pattern and of the identified arrangement of the second sawing pattern; and
a saw under control of the saw module, wherein the saw is configured to cut a plurality of stacked panels according to the arrangement of the first sawing pattern and the arrangement of the second sawing pattern which forms a three-dimensional pattern.

2. The system of claim 1, wherein the path comprises applying an enhancement of the cut plurality of stacked panels.

3. The system of claim 2, wherein the path further comprises identifying a location for placement of the cut plurality of stacked panels following the enhancement.

4. The system of claim 1, wherein the arrangement of the first sawing pattern comprises employing a specified sawing type to cut the plurality of stacked panels.

5. The system of claim 1, wherein the arrangement of the second sawing pattern comprises employing a specified sawing type to cut the plurality of stacked panel.

6. The system of claim 4, wherein the arrangement of the first sawing pattern further comprises a single pattern saw book.

7. The system of claim 4, wherein the arrangement of the first sawing pattern further comprises a multiple pattern saw book.

8. The system of claim 5, wherein the arrangement of the second sawing pattern further comprises a single pattern saw book.

9. The system of claim 5, wherein the arrangement of the second sawing pattern further comprises a multiple pattern saw book.

10. The system of claim 3, wherein the enhancement is performed by a subtractive machinery.

11. The system of claim 3, wherein the enhancement is performed by an additive machinery.

12. The system of claim 7, wherein the saw module causes the saw to cut some of the stacked panels according to the first sawing pattern and to cut some of the stacked panels according to the second sawing pattern.

13. The system of claim 7, wherein the saw module causes the saw to cut less than all of the stacked panels according to the first sawing pattern and to cut less than all of the stacked panels according to the second sawing pattern.

14. The system of claim 1, wherein the plurality of stacked panels with the first sawing pattern and the second sawing pattern form a multiple pattern saw book wherein the first saw pattern is designated to a number of stacked panels.

15. The system of claim 1, wherein operations of the furniture manufacturing facility are performed at a single geographical location.

16. The system of claim 1, wherein operations of the furniture manufacturing facility are performed at a plurality of geographical locations.

17. The system of claim 1, wherein the processor is further configured to perform steps comprising:
selecting, from a collection of sawing patterns, a third sawing pattern for manufacturing the plurality of furniture parts;
identifying an arrangement of the third sawing pattern corresponding to the set of dimensions and a size of a panel; and
a saw module for receiving computer readable instructions of the identified arrangement of the third sawing pattern;
a saw under control of the saw module, wherein the saw is configured to simultaneously cut a plurality of stacked panels according to the arrangement of the first sawing pattern; the arrangement of the second sawing pattern and the arrangement of the third sawing pattern.

18. The system of claim 17, wherein the processor is further configured to perform steps comprising:
selecting, from a collection of sawing patterns, a fourth sawing pattern for manufacturing the plurality of furniture parts;

identifying an arrangement of the fourth sawing pattern corresponding to the set of dimensions and a size of a panel; and
a saw module for receiving computer readable instructions of the identified arrangement of the fourth sawing pattern;
a saw under control of the saw module, wherein the saw is configured to simultaneously cut a plurality of stacked panels according to the arrangement of the first sawing pattern, the arrangement of the second sawing pattern, the arrangement of the third sawing pattern, and the arrangement of the fourth sawing pattern.

* * * * *